(12) United States Patent
Atluru et al.

(10) Patent No.: US 12,015,787 B2
(45) Date of Patent: *Jun. 18, 2024

(54) PREDICTING AND VERIFYING REGIONS OF INTEREST SELECTIONS

(71) Applicant: Dolby Laboratories Licensing Corporation, San Francisco, CA (US)

(72) Inventors: Chaitanya Atluru, San Jose, CA (US); Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/198,085

(22) Filed: Mar. 10, 2021

(65) Prior Publication Data
US 2021/0195212 A1 Jun. 24, 2021

Related U.S. Application Data

(63) Continuation of application No. 15/817,058, filed on Nov. 17, 2017, now Pat. No. 10,979,721.

(60) Provisional application No. 62/423,287, filed on Nov. 17, 2016.

(51) Int. Cl.
| | |
|---|---|
| *H04N 19/167* | (2014.01) |
| *G06V 10/25* | (2022.01) |
| *G06V 20/40* | (2022.01) |
| *H04N 19/162* | (2014.01) |
| *H04N 19/182* | (2014.01) |
| *H04N 19/597* | (2014.01) |

(52) U.S. Cl.
CPC .......... *H04N 19/167* (2014.11); *G06V 10/25* (2022.01); *G06V 20/40* (2022.01); *G06V 20/41* (2022.01); *H04N 19/162* (2014.11); *H04N 19/597* (2014.11); *H04N 19/182* (2014.11)

(58) Field of Classification Search
CPC .. H04N 19/167; H04N 19/162; H04N 19/597; H04N 19/182; G06V 10/25; G06V 20/40; G06V 20/41
See application file for complete search history.

(56) References Cited

U.S. PATENT DOCUMENTS

| | | | |
|---|---|---|---|
| 5,588,914 A | 12/1996 | Adamczyk | |
| 6,252,989 B1 * | 6/2001 | Geisler | H04N 19/64 375/E7.161 |
| 6,389,169 B1 | 5/2002 | Stark | |
| 7,724,972 B2 | 5/2010 | Wang | |
| 8,217,988 B2 | 7/2012 | Park | |

(Continued)

FOREIGN PATENT DOCUMENTS

WO 2002080568 10/2002

OTHER PUBLICATIONS

Santella A. "Robust Clustering of Eye Movement Recordings for Quantification of Visual Interest", ACM 2004 (Year: 2004).*

(Continued)

*Primary Examiner* — Richard A Hansell, Jr.

(57) ABSTRACT

Video images are rendered in viewports of content viewers. Each content viewer views video images through a respective viewport in the viewports. Spatial locations in the video images to which foveal visions of the content viewers are directed are determined. ROIs in the video images are identified based on the spatial locations in the video images.

18 Claims, 15 Drawing Sheets

(56) References Cited

U.S. PATENT DOCUMENTS

| | | | |
|---|---|---|---|
| 8,636,361 B2* | 1/2014 | Chen | A61H 5/00 |
| | | | 351/203 |
| 8,818,018 B2 | 8/2014 | Simske | |
| 8,856,815 B2 | 10/2014 | Cheung | |
| 8,904,297 B2 | 12/2014 | Onda | |
| 8,959,540 B1* | 2/2015 | Gargi | H04N 21/44008 |
| | | | 725/19 |
| 9,025,024 B2 | 5/2015 | Xu | |
| 9,182,817 B2 | 11/2015 | Ratcliff | |
| 9,230,302 B1* | 1/2016 | Owechko | G06V 10/25 |
| 9,324,161 B2 | 4/2016 | Zund | |
| 9,842,268 B1* | 12/2017 | Krafka | G06V 10/235 |
| 10,255,714 B2* | 4/2019 | Mitchell | G06F 3/013 |
| 2002/0141650 A1 | 10/2002 | Keeney | |
| 2003/0194141 A1* | 10/2003 | Kortum | H04N 19/162 |
| | | | 375/E7.182 |
| 2005/0018911 A1* | 1/2005 | Deever | H04N 19/126 |
| | | | 375/E7.14 |
| 2008/0091512 A1* | 4/2008 | Marci | A61B 5/16 |
| | | | 705/7.29 |
| 2009/0067511 A1* | 3/2009 | Wei | H04N 19/176 |
| | | | 348/184 |
| 2012/0154557 A1 | 6/2012 | Perez | |
| 2013/0103624 A1* | 4/2013 | Thieberger | G06N 20/00 |
| | | | 706/12 |
| 2014/0092012 A1* | 4/2014 | Seshadrinathan | G06T 5/90 |
| | | | 345/157 |
| 2015/0110387 A1 | 4/2015 | Lienhart | |
| 2015/0310657 A1 | 10/2015 | Eden | |
| 2016/0093059 A1 | 3/2016 | Tumanov | |
| 2016/0124502 A1 | 5/2016 | Sawyer | |
| 2016/0171340 A1 | 6/2016 | Fleishman | |
| 2016/0259977 A1 | 9/2016 | Asbun | |
| 2017/0109587 A1* | 4/2017 | Thörn | G06F 3/013 |
| 2017/0236252 A1* | 8/2017 | Nguyen | G06T 3/4092 |
| | | | 345/419 |
| 2017/0285736 A1* | 10/2017 | Young | G06F 3/013 |
| 2017/0359586 A1* | 12/2017 | Xue | H04N 19/124 |
| 2018/0081178 A1 | 3/2018 | Shpunt | |
| 2018/0189958 A1* | 7/2018 | Budagavi | H04N 21/84 |
| 2018/0192058 A1* | 7/2018 | Chen | G06T 7/11 |
| 2018/0227579 A1* | 8/2018 | Shen | H04N 19/597 |
| 2018/0288435 A1* | 10/2018 | Boyce | H04N 19/105 |
| 2018/0302556 A1* | 10/2018 | Baran | H04N 19/167 |
| 2020/0234432 A1* | 7/2020 | Rose | A61B 5/742 |
| 2022/0036515 A1* | 2/2022 | Lee | H04N 19/18 |

OTHER PUBLICATIONS

Gopalan R. "Exploiting Region of Interest for Improved Video Coding", Thesis, Ohio State University, 2009 (Year: 2009).*

Nyström et al. "Deriving and evaluating eye-tracking controlled volumes of interest for variable-resolution video compression", J. Electronic Imaging 16(1), 013006 (Jan.-Mar. 2007) (Year: 2007).*

Lee et al. Efficient Video Coding in H.264/AVC by using Audio-Visual Information, MMSP'09, IEEE Oct. 5-7, 2009, Rio de Janeiro, Brazil (Year: 2009).*

Johannesson E. "An eye-tracking based approach to gaze prediction using low-level features" Master's Thesis Spring 2005, Dept. of Cognitive Science, Lund University, Sweden (Year: 2005).*

Biocca, F. et al "Attention Funnel: Omnidirectional 3D Cursor for Mobile Augmented Reality Platforms" Proc. of the SIGCHI Conference on Human Factors in Computing Systems, pp. 1115-1122, Apr. 22, 2006, ACM New York,USA.

Gopalan, R. "Exploiting Region of Interest for Improved Video Coding", Thesis, Ohio State University, 2009.

Johannesson, E. "An Eye-tracking Based Approach to Gaze Prediction Using low-level Features" Master's Thesis Spring, 2005, Dept. of Cognitive Science, Lund University, Sweden.

Khuwuthyakorn, P. et al "Object of Interest Detection by Saliency Learning" Computer Vision 2010, pp. 636-649.

Lee, Jong-Seok et al "Efficient Video Coding in H.264/AVC by using Audio-Visual Information" IEEE Multimedia Signal Processing, Piscataway, NJ, USA, Oct. 5, 2009, pp. 1-6.

Liu, T. et al "Learning to Detect a Salient Object" IEEE Conference on Computer Vision and Pattern Recognition, Minneapolis, MN, 2007, pp. 1-8, 2007.

Nystrom, M. et al "Deriving and Evaluating Eye-Tracking Controlled vols. of Interest for Variable-Resolution Video Compression" Journal of Electronic Imaging, Feb. 23, 2007, pp. 1-8.

Santella, A. "Robust Clustering of Eye Movement Recordings for Quantification of Visual Interest", ACM 2004.

Yarbus, Alfred "Eye Movements and Vision" Plenum Press, New York, Jun. 1967.

Zhou, Jun "Regions of Interest Detection by Machine Learning Approaches" Institute for Integrated and Intelligent Systems (IIIS) and School of Information and Communication Technology (ICT) Feb. 28, 2012.

* cited by examiner render video images in viewports of content viewers 422 determine spatial locations in the video images, to which foveal visions of the plurality of content viewers is directed 424 identify, based on the spatial locations in the video images, ROIs in the video images 426

FIG. 4B receive user input specifying pre-designated ROIs in video images 442 identify second video images that are similar to the video images 444 based on available user viewing behavior data collected for the second video images, determining whether the pre-designated ROIs are to be perceived by prospective content viewers as ROIs 446

FIG. 4C

PREDICTING AND VERIFYING REGIONS OF INTEREST SELECTIONS

CROSS-REFERENCE TO RELATED APPLICATIONS

This application is a continuation of U.S. patent application Ser. No. 15/817,058 filed on Nov. 17, 2017, which claims priority to U.S. Provisional Patent Application No. 62/423,287, filed Nov. 17, 2016, the entire contents of which are hereby incorporated by reference in its entirety as if originally set forth herein. The applicant(s) hereby rescind any disclaimer of claim scope in the parent application(s) or the prosecution history thereof and advise the USPTO that the claims in this application may be broader than any claim in the parent application(s).

TECHNOLOGY

The present invention relates generally to image coding and rendering, and in particular, to predicting and verifying regions of interest (ROIs) selections.

BACKGROUND

Video images such as omnidirectional images, etc., can be used to support many different fields of views (FOVs) to a physical or artificial environment depicted in the video images. Before being compressed by an upstream device and transmitted to downstream clients, the video images may be of a relatively high spatial resolution, a relatively high dynamic range, a relatively wide color gamut, etc. In order to transmit the video images for rendering to end users, image data in the video images needs to be greatly compressed in many operational scenarios.

What are of interest to content viewers may be occurring in only certain spatial portions of any given video images. Compressing the video images spatially uniformly over all spatial portions of the video images leads to a degradation of viewing experience, as image portions in the spatial portions of spatial regions that are of interest to the content viewers are equally degraded by compression as other image portions in other spatial regions that are of no or little interest to the content viewers.

Alternatively, content creators such as artistic directors, color graders, video content creators, etc., may be actively designating and delineating interesting image portions for less lossy compression as a part of a content creation process. However, this is likely to be labor intensive, error prone and ineffective, especially for omnidirectional images, as the content creators may incorrectly assume that end users would direct their fields of views to the designated interesting image portions among many possible fields of views supported by the omnidirectional images.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A through FIG. 4C illustrate example process flows;

DESCRIPTION OF EXAMPLE EMBODIMENTS

Figure 1B:
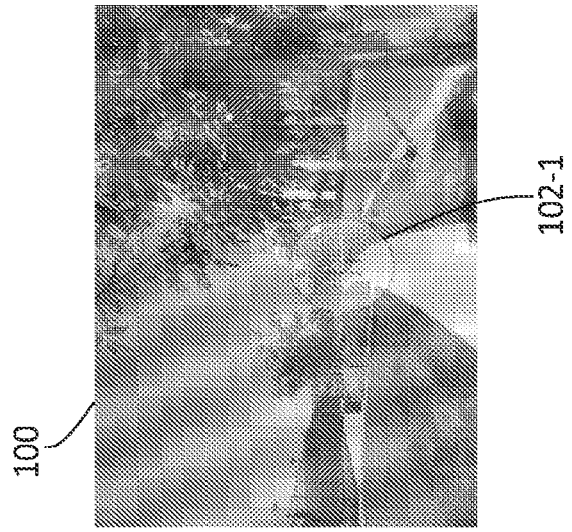
FIG. 1A through FIG. 1F illustrate an example video image, example individual fields of views to the video image, and an example ROI.

Example embodiments, which relate to predicting and verifying ROIs selections, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. REGIONS OF INTEREST
3. SIMPLE VIDEO SCENES
4. COMPLEX VIDEO SCENES
5. EXAMPLE ROI-RELATED USE CASES
6. IMPORTING USER VIEWING BEHAVIOR DATA
7. VERIFICATION AND FULFILLMENT OF ARTISTIC INTENT
8. EXAMPLE MEDIA STREAMING SERVERS AND CLIENTS
9. EXAMPLE PROCESS FLOWS
10. IMPLEMENTATION MECHANISMS—HARDWARE OVERVIEW
11. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Under some approaches, image portions in video images in video clips may be compressed in a spatially uniform manner without identifying any ROIs. Bitrates and energies may be spent on image portions that are not interesting to content viewers as much as bitrates and energies spent on image portions that are interesting to the content viewers. Much of the bitrates and energies under these approaches would be wasted without gaining viewing experience improvements, as the content viewers would mostly direct their fields of views to the interesting image portions.

Alternatively, objective metrics may be computed and used to determine how the video images should be compressed and rendered. As each video clip has its own audio and visual characteristics, computing and using objective metrics for compression would need a very large number of objective metric variables and parameters to be processed to come up with a close enough correct answer. Computing objective metrics would need large amounts of computing resources and processing times. Further, these objective metrics may not be accurate in predicting what content viewers would be interested.

By way of example, spatial frequency distributions may be computed for luminance values as well as chrominance values of the video images. Relatively high spatial frequency content in the video images may be encoded into compressed image data of relatively high peak-signal-noise-ratios (PSNRs) in encoded video images, whereas relatively low spatial frequency content (e.g., relatively smooth video content, etc.) in the video images may be encoded into compressed image data of relatively low PSNRs in the encoded video images. However, if the relatively low spatial frequency content happens to represent an ROI to a large user population, the encoded video images as rendered may be perceived as a whole to be of poor video quality.

Additionally, optionally or alternatively, video images may be compressed and rendered with ROIs predesignated based on artistic intents of content creators. Image portions in the predesignated ROIs in the video images may be encoded into compressed image data with less quantization errors in encoded video images, whereas content outside the predesignated ROIs in the video images may be encoded into compressed image data with more quantization errors in the encoded video images.

However, as the video images may be used to support a wide range of fields of views, content viewers may direct their fields of views to the video images, which may deviate significantly from what have been designated as the ROI by the content creators. As a result, if a large percentile of a user population happens to direct their fields of views away from the predesignated ROIs in the video images, the encoded video images as rendered to the large percentile of the user population may still be perceived as a whole to be of poor video quality, in addition to missing the artistic intents of the content creators.

In some embodiments, content viewers' viewing angles or fields of views are monitored in real time. These fields of views can be provided as feedbacks to an upstream device such as one or more of: video encoders, media streaming servers, etc. The upstream device may use the feedbacks to send less compressed video content for rendering in the viewer's viewports corresponding to the viewers' fields of views as indicated in the feedbacks.

However, there may be a relatively long user perceivable time lag (e.g., longer than 20 milliseconds, longer than 30 milliseconds, etc.) between a first time at which the viewers' fields of views are determined and a second time at which the less compressed video content is delivered to and rendered on the viewer's display devices. This long user perceivable time lag may be especially pronounced in fast action videos, with slow computing devices, with high latency networking connections, etc.

As a result, a seamless (immersive) viewing experience is likely to be very difficult or even impossible to achieve. Instead, poor video quality, poor audio quality, time lags, etc., become readily perceivable to the content viewers.

Techniques as described herein can be used to predict and verify ROIs selections for streaming video content between media streaming server(s) and media streaming client(s). Example video content may include, but are not necessarily limited to, any of: audiovisual programs, movies, video programs, TV broadcasts, computer games, augmented reality (AR) content, virtual reality (VR) content, etc. Example media streaming clients may include, but are not necessarily limited to, any of: display devices, a computing device with a near-eye display, a head-mounted display (HMD), a mobile device, a wearable display device, a set-top box with a display such as television, a video monitor, etc.

As used herein, a "media streaming server" may refer to one or more devices that prepare and stream video content to one or more media streaming clients in order to render at least a portion (e.g., corresponding to a user's FOV or viewport, etc.) of the video content on one or more displays. The displays on which the video content is rendered may be part of the one or more media streaming clients, or may be operating in conjunction with the one or more media streaming clients.

Example media streaming servers may include, but are not necessarily limited to, any of: cloud-based media streaming servers located remotely from media streaming client(s), local media streaming servers connected with media streaming client(s) over local wired or wireless networks, VR devices, AR devices, digital media devices, digital media receivers, set-top boxes, gaming machines (e.g., an Xbox), general purpose personal computers, tablets, dedicated digital media receivers such as the Apple TV or the Roku box, etc.

Under techniques as described herein, one or more ROIs can be identified from the entire area of a video image—whether spherical, rectangular, or of other shapes. An ROI may span or cover only a proper subset of the entire area of the video image. A media streaming server can compress (or encode) and transmit respective image portions within the one or more ROIs and without (or outside) the one or more ROIs with different compression levels, different spatiotemporal resolutions, different bitrates, etc., instead of compressing and transmitting video image with a spatially uniform compression level. Additionally, optionally or alternatively, the image portions within the one or more ROIs can be cached or prebuffered in advance or in real time at content caching nodes, whereas other image portions outside the one or more ROIs may or may not be cached or prebuffered in advance or in real time at content caching nodes. Example content caching nodes may include, without limitation, edge nodes of a content distribution network, media content servers close to content requesting clients geographically and/or in network topology, etc. The image portions within the ROIs can be served from a local cache at the content caching nodes in a network (e.g., content delivery network, access network, core network, content distribution network, etc.) for low latency and/or at a relatively high bit rate than the other image portions, which may or may not be served out from the local cache and which may or may not be served for low latency and/or at a relatively high bit rate. As a result of prebuffering/caching, the image portions within the one or more ROIs can be sent to requesting content clients relatively expeditiously as compared with the other image portions outside the one or more ROIs.

Accordingly, the techniques as described herein can be used to reduce or minimize the data volume of video content to be streamed between a media streaming server and a media streaming client (e.g., a client device that consumes and/or plays the streamed video content, etc.), thereby reducing or minimizing the need for using a relatively large bandwidth budget to stream video content and efficiently supporting a wide variety of video streaming applications to a wide variety of downstream devices. At the same time, the techniques as described herein can be used to allow users of downstream recipient devices to freely vary the users' individual fields of views to the video image.

Under techniques as described herein, ROIs in video images can be identified based on user viewing behavior data that informs subjective points of views of content viewers with respect interesting image portions of the video image. Rather than applying spatially uniform compression or applying spatially different compression levels based on objective metrics (e.g., PSNRs, etc.), under techniques as described herein, less compressions are applied to the image portion in the ROI in the video images, as the content viewers are likely more interested in having a relatively high quality in their fields of views rather than the same quality everywhere.

Example embodiments described herein relate to determining ROIs in video images. One or more video images in a plurality of viewports of a plurality of content viewers are rendered. A content viewer in the plurality of content viewers views the one or more video images through a respective viewport in the plurality of viewports. A plurality of spatial locations is determined, in the one or more video images, to which a plurality of foveal visions of the plurality of content viewers is directed. One or more ROIs in the one or more video images are identified based on the plurality of spatial locations in the one or more video images.

Example embodiments described herein relate to verifying ROIs in video images. User input specifying one or more pre-designated ROIs in one or more video images is received. One or more second video images that are similar to the one or more video images are identified. Based at least in part on available user viewing behavior data collected for the one or more second video images, it is determined whether the pre-designated ROIs are to be perceived by prospective content viewers as ROIs.

In some example embodiments, mechanisms as described herein form a part of a media processing system, including but not limited to any of: cloud-based server, mobile device, virtual reality system, augmented reality system, head up display device, helmet mounted display device, CAVE-type system or wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. REGIONS OF INTEREST

In some embodiments, to identify or predict the ROIs where the content viewers' fields of views would occur or converge at a given time in a given video clip, computer vision algorithms (e.g., any combination of one or more computer vision techniques such as Haar Filters, wavelet decomposition, Fourier space based spatial resolution tracking, etc.) may run in order to identify humans or various objects such as cars, buildings, phones, etc. Certain spatial regions in the entire area of a video image may be determined/delineated as the ROIs based on the identified humans or objects. As used herein, a video clip may refer to a video-only clip, an audiovisual media clip, a video clip with a corresponding audio clip, a media program, a portion or a segment of a media program, etc.

In some embodiments, visual objects, visual elements, etc., in the video image(s) (e.g., 100, etc.) can be found semantically based on other visual objects, visual elements, etc., present in the same image. For example, players can be found semantically after a football is discovered in the same image. The visual objects, visual elements, etc., as determined in the video image(s) may be used to generate or identify spatial locations of ROIs in the video image(s).

However, there may exist errors in identifying ROIs based on humans and objects detected from video images based on computer vision analysis of the video images, as these ROIs may differ from intended ROIs according to content creators' artistic intent (e.g., director's intent, color grader's intent, etc.).

Figure 4A:
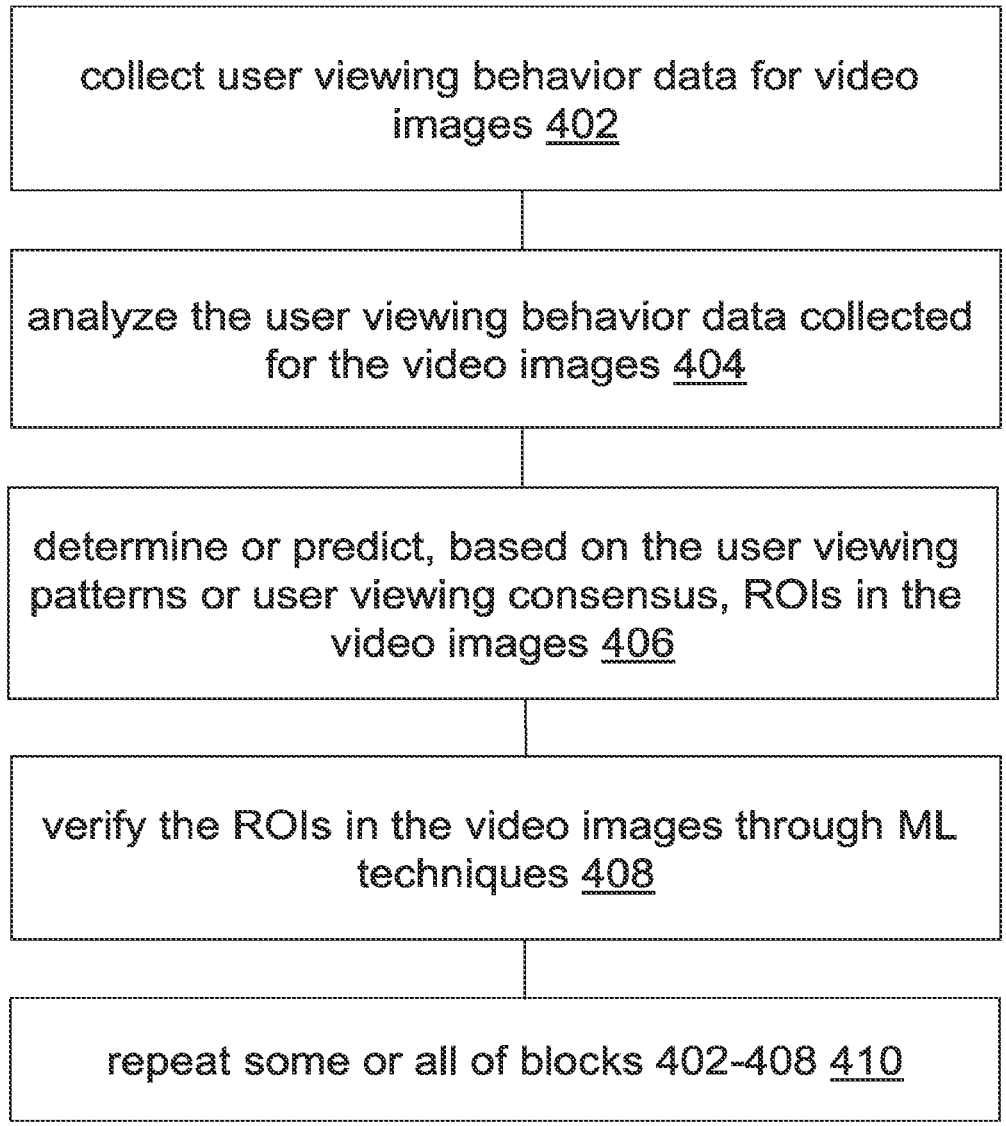

FIG. 4A illustrates an example process flow for determining or predicting ROIs in video images. In block 402, an ROI prediction system as described herein collects user viewing behavior data for video images from a user population (or a plurality of media streaming client devices thereof) that comprises a (e.g., relatively large, growing over time, etc.) number of content viewers that view the video images through their respective fields of views. As used herein, the term "content creator" refers to a director, a color grader, a video editor, etc., that creates or modifies video images that are to be viewed by content viewers. The term "content viewer" refers to an end user, a consumer, a player, etc., that views (but does not create or edit) video images that have been created by one or more content creators.

In block 404, the ROI prediction system analyzes the user viewing behavior data collected for the video images to determine user viewing patterns or user viewing consensus.

In block 406, the ROI prediction system determines or predicts, based on the user viewing patterns or user viewing consensus, ROIs in the video images, for example, with relatively high probabilities, especially when a relatively large volume of the user viewing behavior data is available.

Additionally, optionally or alternatively, in block 408, the ROI prediction system determines, predicts, verifies, modifies, and/or refines, at least some of the ROIs in the video images through machine learning (ML) based ROI prediction techniques.

In block 410, this process of collecting user viewing behavior data for video images, analyzing the user viewing behavior data to determine user viewing patterns or user viewing consensus, using the user viewing patterns or consensus to determine ROIs in the video images, and/or predicting ROIs in the video images with ML-based ROI prediction techniques may be continuously performed over time to refine or update the predictions or determinations of the ROIs in the video images, as more content viewers view the video images and more user viewing behavior data is collected.

For example, when a movie is just released and viewed the first time, the content viewer may see relatively low video quality and/or relatively long transition between low video quality to high video quality. Over time, the ROI prediction system estimates or predicts where content viewers look at particular image portions of video images in the movie. These image portions are then given high resolution, high dynamic range, wide color gamut, and/or high processing priority. Additionally, optionally or alternatively, image portions within ROIs can be cached or prebuffered in advance or in real time at content caching nodes, whereas other image portions outside the ROIs may or may not be cached or prebuffered in advance or in real time at content caching nodes. The image portions within the ROIs can be served from a local cache at the content caching nodes in a network (e.g., content delivery network, access network, core network, content distribution network, etc.) for low latency and/or at a relatively high bit rate than the other image portions, which may or may not be served out from the local cache and which may or may not be served for low latency and/or at a relatively high bit rate. As a result of prebuffering/caching, the image portions within the ROIs can be sent to requesting content clients relatively expeditiously as compared with the other image portions outside the ROIs. As a result, viewing experience of the movie gets better, as more and more user viewing behavior data is collected, and as more and more the ROI prediction system determines with high confidence what to transmit for rendering on display devices and when.

3. SIMPLE VIDEO SCENES

Figure 1A:
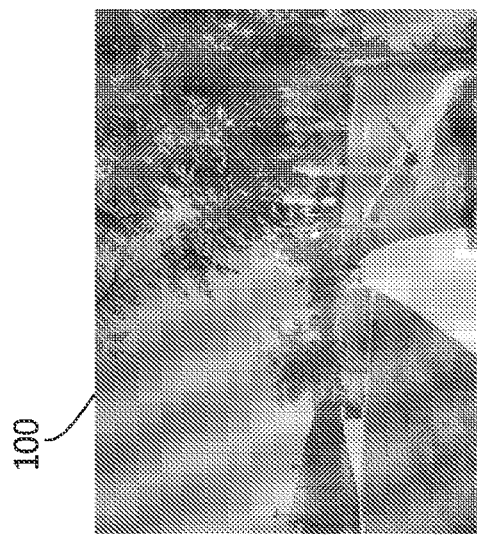

FIG. 1A illustrates an example video image 100 out of a video clip. The video image (100) depicts walkway, buildings, fences, trees and people, and is relatively simple for determining a ROI in the video image (100) from a subjective point of view of a content viewer.

When the video clip is presented to content viewers, the content viewers can choose where to look at in the video image (100) based on their individual determinations of ROIs, as illustrated in FIG. 1B through FIG. 1E.

Figure 1D:
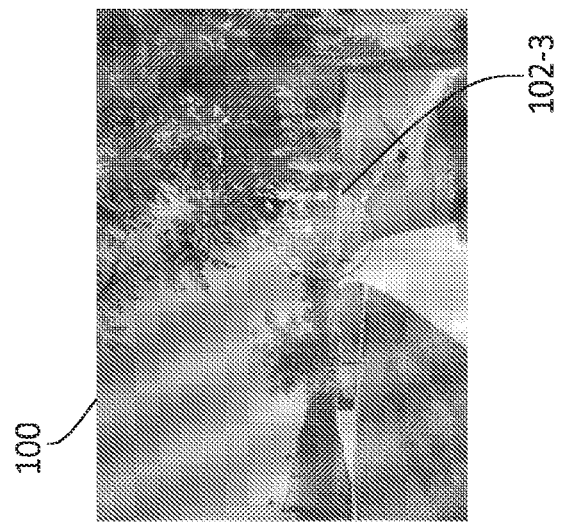
Figure 1C:
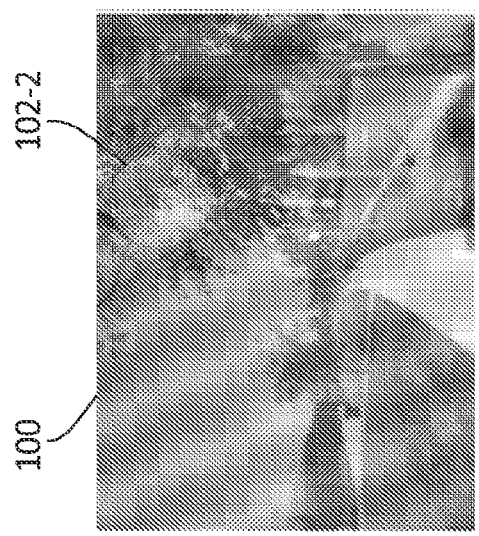
Figure 1F:
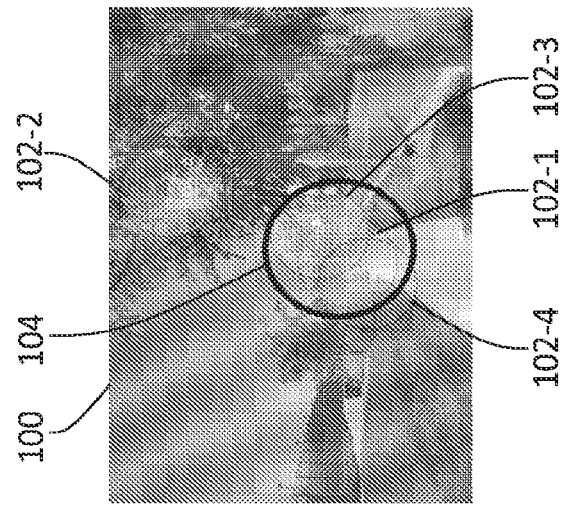
Figure 1E:
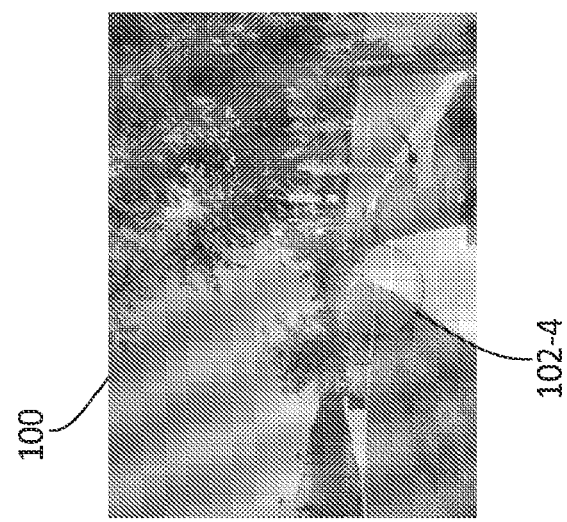

More specifically, FIG. 1B illustrates a first example ROI 102-1 as chosen by a first content viewer. FIG. 1C illustrates a second example ROI 102-2 as chosen by a second content viewer. FIG. 1D illustrates a third example ROI 102-3 as chosen by a third content viewer. FIG. 1E illustrates a fourth example ROI 102-4 as chosen by a fourth content viewer.

In some embodiments, these content viewers may be randomly selected. In some embodiments, video images (e.g., 100, etc.) in the video clip may be shown to these randomly selected content viewers without any visual, audio or other user perceptible cues, for example, from a source of the video clip.

Figure 3A:
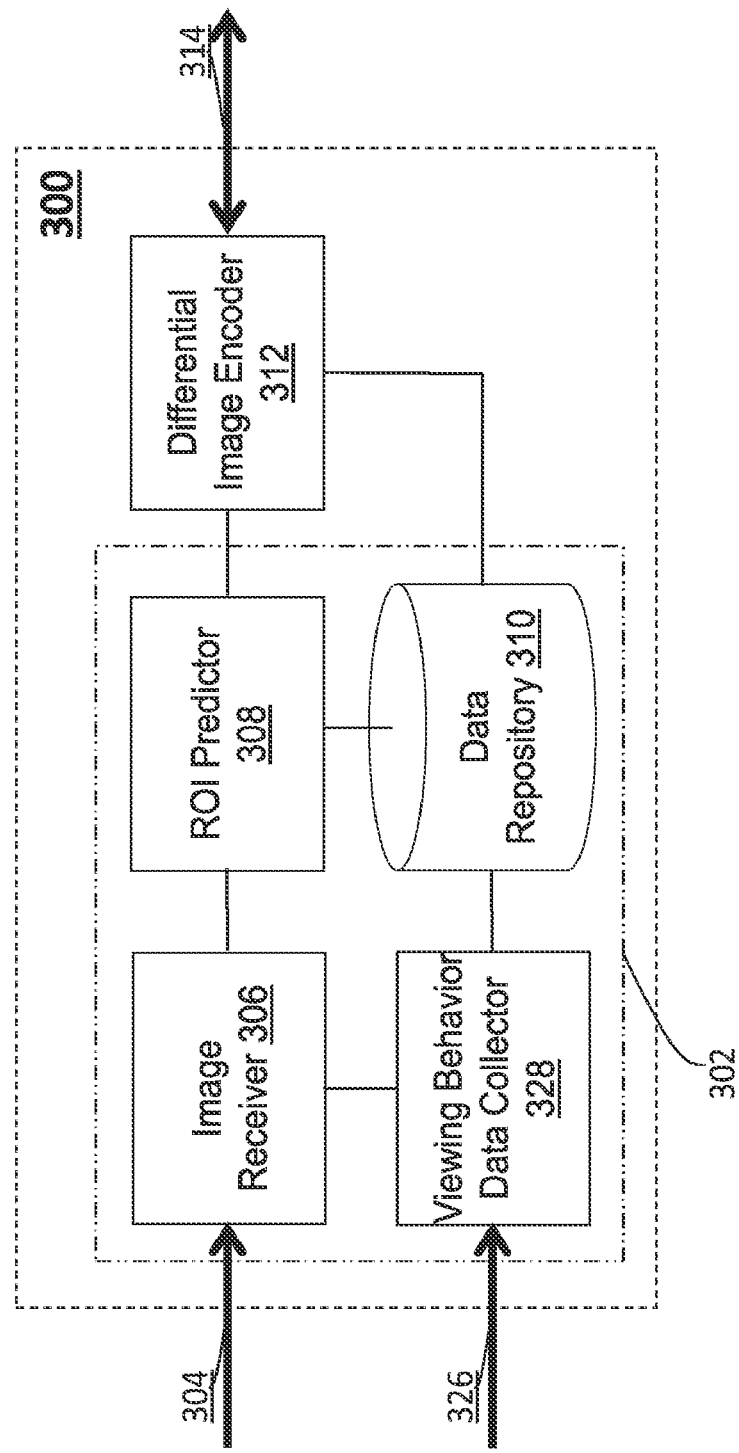
FIG. 3A through FIG. 3C illustrate example media streaming servers and clients.
Figure 3B:
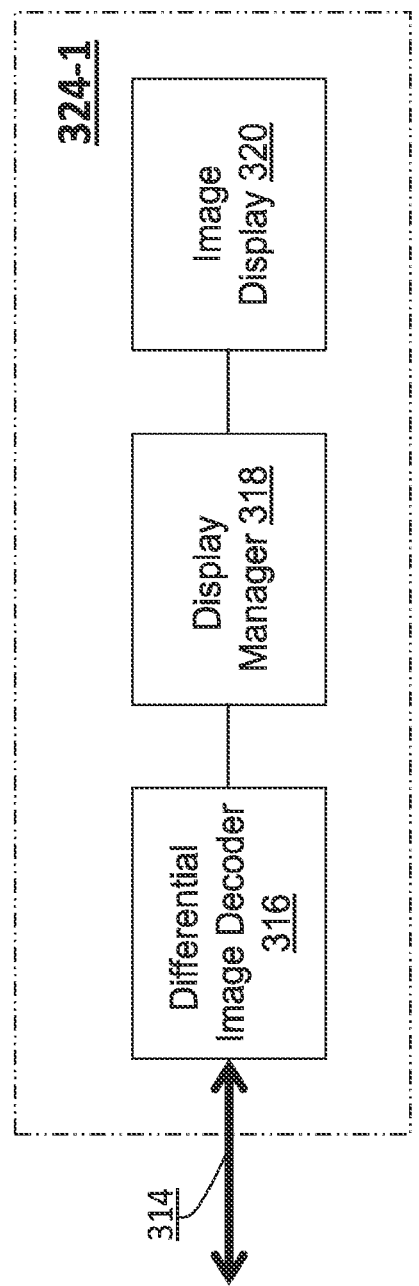
Figure 3C:
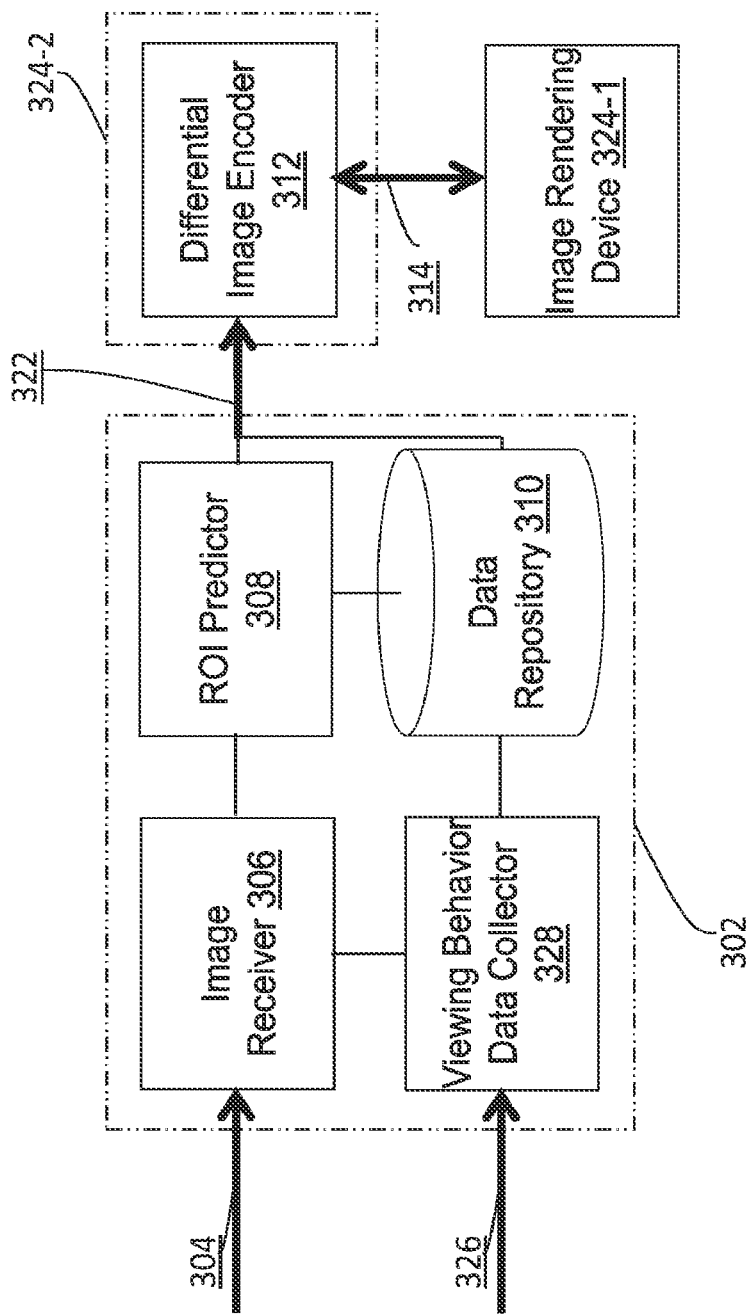

The individual ROI determinations of the content viewers may be collected (e.g., in a user viewing behavior data flow 326 by a user viewing behavior data collector 328 of FIG. 3A or FIG. 3C, etc.) as input data or user viewing behavior data of the video image (100). The user viewing behavior data of the video image (100) can be analyzed to determine a predicted ROI 104 (in FIG. 1F) where the next user (e.g., a fifth user, etc.) would probably look. In some embodiments, the predicted ROI (104) may be generated as an intersection, as a union, etc., by overlaying the individual ROIs in the user viewing behavior data.

An ROI as described herein refers to a spatial region of a video image that is determined or predicted to be of interest to an individual content viewer or to a user population that comprises a plurality of content viewers. The ROI can be of a regular shape (e.g., a rectangular shape, a circular shape, an oval shape, etc.) or an irregular shape (e.g., an intersection of multiple regular or irregular shapes, a union of multiple regular or irregular shapes, etc.).

In various embodiments, an ROI as described herein may be of different spatial sizes. A spatial size of the ROI can be defined in terms of pixel numbers, spatial dimensions, portions of a content viewer's vision field (e.g., covering 4-6 angular degrees of a foveal vision, covering up to 15 angular degrees of a paracentral vision, covering up to a mid-peripheral vision, etc.), etc.

In some embodiments, an ROI may be of an image portion that covers the foveal vision of an individual content viewer. In some embodiments, an ROI of an individual content viewer may be of an image portion that covers the foveal vision of an individual content viewer as well as a safety margin around the foveal vision; different implementations can set different spatial sizes for the safety margin. In some embodiments, an ROI may be of an image portion that covers the viewport of an individual content viewer. In some embodiments, an ROI may be of an image portion that covers a portion of the viewport of an individual content viewer.

As noted, the video clip that includes the view image (100) is considered relatively simple. Hence, as illustrated in FIG. 1F, the user viewing consensus among the randomly selected users converges relatively fast to the predict ROI (104) with a limited volume of user viewing behavior data as input.

4. COMPLEX VIDEO SCENES

Figure 2B:
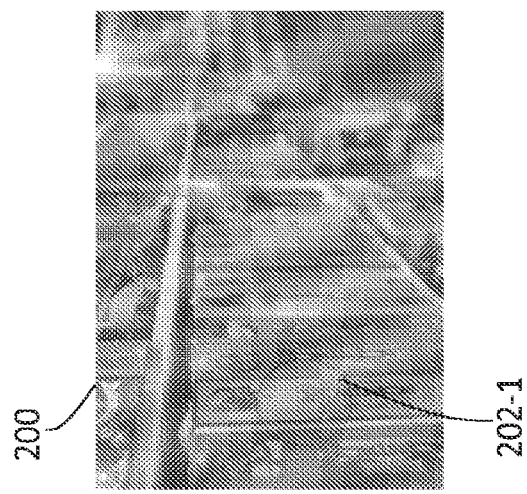
FIG. 2A through FIG. 2H illustrate an example video image, example individual fields of views to the video image, and example ROIs.
Figure 2A:
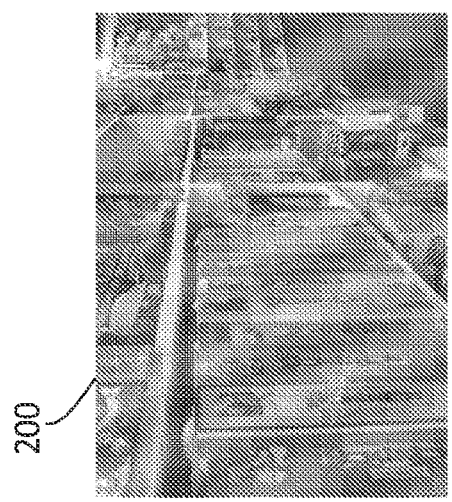

FIG. 2A illustrates another example video image 200 out of another video clip. The video image (200) depicts a number of objects, and is relatively complex from the perspective of determining a ROI in the video image (200).

When the video clip in the present example is presented to content viewers, the content viewers can choose where to look at in the video image (200) based on their individual determinations of ROIs (e.g., 202-1 through 202-6), as illustrated in FIG. 2B through FIG. 2G.

Figure 2C:
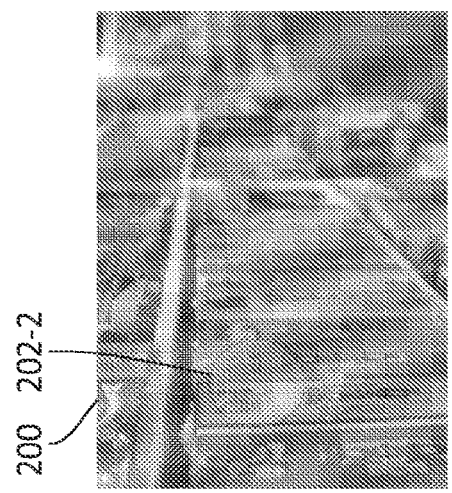
Figure 2D:
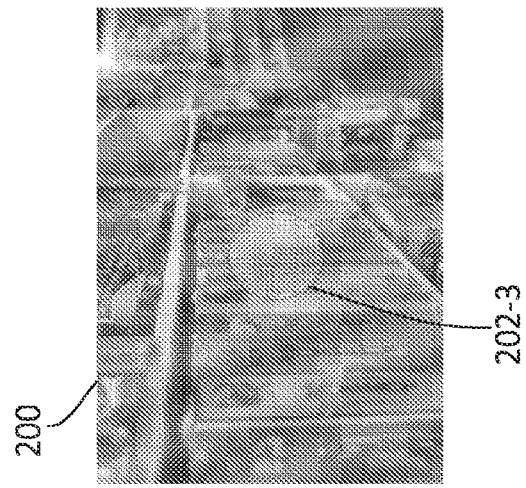
Figure 2E:
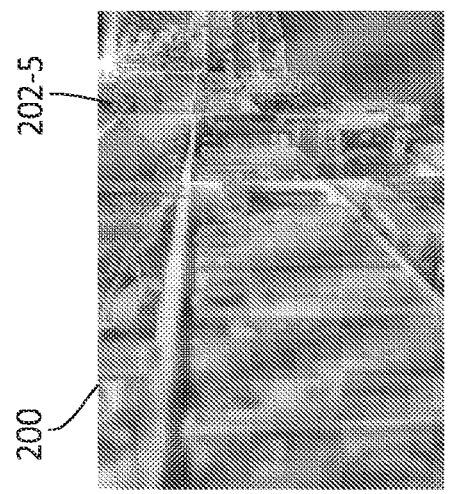
Figure 2F:
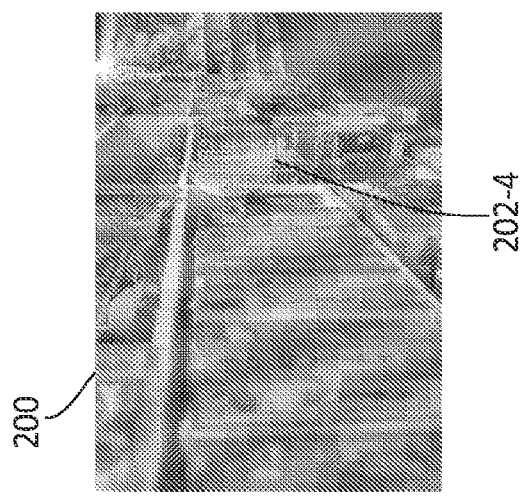
Figure 2H:
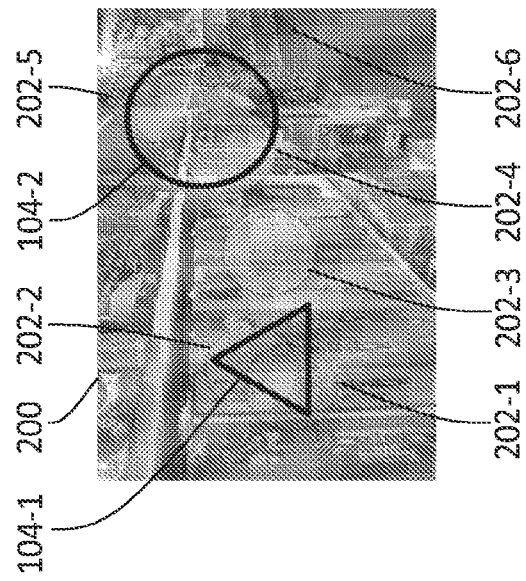
Figure 2G:
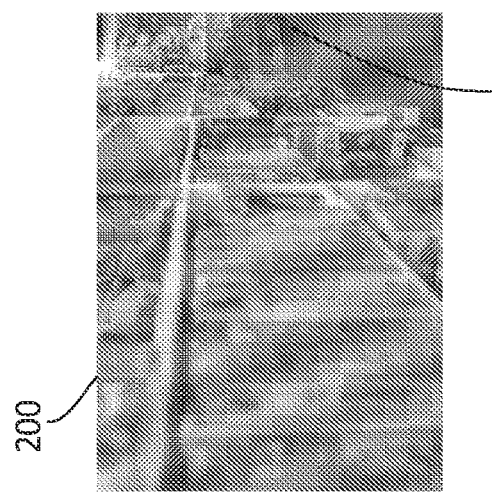

More specifically, FIG. 2B illustrates a first example ROI 202-1 as chosen by a first content viewer. FIG. 2C illustrates a second example ROI 202-2 as chosen by a second content viewer. FIG. 2D illustrates a third example ROI 202-3 as chosen by a third content viewer. FIG. 2E illustrates a fourth example ROI 202-4 as chosen by a fourth content viewer. FIG. 2F illustrates a fifth example ROI 202-5 as chosen by a fifth content viewer. FIG. 2G illustrates a sixth example ROI 202-6 as chosen by a sixth content viewer.

In some embodiments, these content viewers may be randomly selected. In some embodiments, video images (e.g., 200, etc.) in the video clip may be shown to these randomly selected content viewers without any visual, audio or other user perceptible cues, for example, from a source of the video clip.

The individual ROI determinations of the content viewers may be collected (e.g., in a user viewing behavior data flow 326 by a user viewing behavior data collector 328 of FIG. 3A or FIG. 3C, etc.) as input data or user viewing behavior data of the video image (200). The user viewing behavior data of the video image (200) can be analyzed to determine one or more predicted ROIs (e.g., 104-1, 104-2, etc., in FIG. 2H) where the next user (e.g., a fifth user, etc.) would probably look.

As previously noted, this video clip is considered complex for determining or predicting ROIs, which would take a much longer time and/or a lot more content viewers to reach consensus. In some embodiments, ML-based ROI prediction techniques may be applied to the user viewing behavior data in order to arrive at a relatively precise determination or prediction of an ROI in the video image (200). Additionally, optionally or alternatively, additional data other than the user viewing behavior data may be analyzed in order to arrive at a relatively precise determination or prediction of the ROIs (104-1 and 104-2) in the video image (200).

The analysis of the additional data with the user viewing behavior data, and/or the application of the ML-based ROI prediction techniques to the user viewing behavior data and the additional data, may lead to predicting multiple ROIs (e.g., 104-1, 104-2, etc., in FIG. 2H) inside a picture such as the video image (200).

For example, the user viewing behavior data may be further analyzed using ML techniques such as a k-Nearest Neighbors (k-NN) classification algorithm to determine these multiple ROIs (e.g., 104-1, 104-2, etc., in FIG. 2H) within the video image (200). As a video image as described herein such as the video image (200) may contain multiple spatial regions (e.g., areas, volumes, etc.) depicting image content (e.g., two space ships, a police car and a chased car, etc.) interesting to a user population, a substantial number or percentile in all content viewers in the user population may view each of the multiple spatial regions. One group (e.g., 30%, 40%, 50%, 60%, 70%, etc.) of the content viewers may view or visually converge to a first spatial region (e.g., a left part in the video image, etc.) in the multiple spatial regions, whereas one or more other groups (e.g., 70%, 60%, 50%, 40%, 30%, etc.) of the content viewers may view or visually converge to one or more spatial regions (e.g., a right part in the video image, a middle part in the video image, etc.) in the multiple spatial regions. A classification algorithm such as the k-NN algorithm may be used to localize the individual ROIs as determined from viewport information of the content viewers into two or more spatial clusters, ROIs, etc. In some embodiments, other information (e.g., spatial audio information, flashing light, etc.) available in connection with the video image and/or with the user viewing behavior data may be detected, collected, or used, to disambiguate people, objects, etc., from one another for the purpose of determining multiple ROIs in the video image.

Additionally, optionally or alternatively, one, some or all of a wide variety of classification algorithms other than the k-NN classification algorithm can be used in place of or in addition to the k-NN classification algorithm. These other classification algorithms may include, without limitation, k-means clustering algorithm, linear discriminant analysis (LDA), nearest centroid classifier, nearest prototype classifier, Rochhio classifier, etc.

5. EXAMPLE ROI-RELATED USE CASES

An ROI prediction system implementing techniques as described herein may support a variety of use cases for identifying a single ROI, identifying multiple ROIs, applying ML-based ROI prediction method, applying unique path determination of ROIs across multiple video images in a video clip or a media program, applying differential image encoding to image portions in and outside ROIs, etc. By way of example but not limitation, some use case examples are described as follows.

In a first example use case (simple), a single ROI is selected or predicted in the video image, for example, based on a majority user viewing consensus or pattern. One or more (e.g., statistical, mean, variance, deviation, probabilities, modes, etc.) data analysis algorithms or techniques may be applied to user viewing behavior data of the video image (e.g., 100 of FIG. 1A through FIG. 1F, etc.) to determine the user viewing consensus or pattern. The video image may be compressed and/or rendered with relatively high PSNRs (to preserve image details) for the image portion in the ROI as compared to other image portions (not in the ROI) of the video image; the other image portions of the video image may be compressed and/or rendered with relatively low or medium PSNRs (with possible or probable loss of image details).

In a second example use case (complex), a majority consensus may not be converged on a single location as an ROI in the video image. In addition to or in place of determining user viewing pattern or consensus based on (e.g., statistical, etc.) data analysis performed on user viewing behavior data of the video image, ML-based ROI prediction techniques such as one or more classification algorithms may be applied to the user viewing behavior data of the video image (e.g., 200 of FIG. 2A through FIG. 2H, etc.) to determine multiple ROIs in the video image. The video image may be compressed and/or rendered with relatively high PSNRs (to preserve image details) for image portions in the multiple ROIs as compared to other image portions (not in the multiple ROIs) of the video image; the other image portions of the video image may be compressed and/or rendered with relatively low or medium PSNRs (with possible or probable loss of image details).

In a third example use case (complex), a majority consensus may not be converged on a single location as an ROI in the video image. In addition to or in place of determining user viewing pattern or consensus based on (e.g., statistical, etc.) data analysis performed on user viewing behavior data of the video image and/or applying classification algorithms the user viewing behavior data of the video image (e.g., 200 of FIG. 2A through FIG. 2H, etc.), ML-based ROI prediction techniques are applied to user viewing behavior data of the video clip (e.g., all video images therein, a subset of video images therein including the video image, etc.) to determine a single unique path ROI or multiple unique path ROIs across multiple video images of the video clip that include the video image.

By way of example but not limitation, candidate ROIs can be determined for each of the multiple video images of the video clip. Candidate ROIs in (e.g., two, three, etc.) adjacent video images of the multiple video images of the video clip may be correlated based on their spatial locational proximity or spatial locational continuity with one another to form candidate unique path ROIs across the multiple video images. The single unique path ROI or multiple unique ROIs across the multiple video images may be selected or predicted based on one or more metrics based on user viewing behavior data, user viewing pattern, proximity or density of the candidate unique path ROIs, etc.

Each of the single unique path ROI or the multiple unique path ROIs across the multiple video images may represent a unique (or distinct) spatial path in a spatial environment depicted in the video clip, and may represent a distinct (e.g., contiguous) spatial area in each of the multiple video images of the video clip. The multiple video images including the video image may be compressed and/or rendered with relatively high PSNRs (to preserve image details) for image portions that are in the single unique path ROI or the multiple unique path ROIs as compared to other image portions (not in the single unique path ROI or the multiple unique path ROIs) of the video images; the other image portions of the video images may be compressed and/or rendered with relatively low or medium PSNRs (with possible or probable loss of image details).

In a fourth example use case (augmentation), which may or may not be any of the above use cases, spatial audio (e.g., ATMOS, binaural audio, stereo, 5.1 audio, 7.1 audio, audio data with metadata for sound sources, etc.) may be used to find a correlated ROI. For example, one or more spatial locations of sound sources (e.g., whispering, police siren, baby crying, explosions, etc.) in the video image or the multiple video images including the video image may be detected or determined in the spatial audio emanating for the video image or the multiple video images including the video image. A single ROI or multiple ROIs may be determined or predicted based in part on the spatial locations of the sound sources in the spatial audio. In some embodiments, the spatial locations of the sound sources in the spatial audio are used or predicted as location(s) of the single ROI or multiple ROIs.

For example, based on information extracted from or determined with audio metadata, spatial coordinates of a flying bee may be tracked in a video clip. A spatial trajectory formed/represented by the spatial coordinates of the flying bee may be combined with image portions depicting the flying bee in determining an ROI in any given video image of the video clip. The spatial trajectory of the flying bee and the image portions may be further combined with content viewers' eye movements as determined or received in user viewing behavior data to determine the ROI.

Similarly, based on information extracted from or determined with audio metadata, spatial coordinates of a police siren may be tracked in a video clip. A spatial trajectory formed/represented by the spatial coordinates of the siren may be combined with image portions depicting a police car sounding the police siren in determining an ROI (e.g., an image portion depicting the police car at a given time point) in any given video image of the video clip. The spatial trajectory of the police siren and the image portions depicting the police car may be further combined with content viewers' eye movements as determined or received in user viewing behavior data to determine the ROI.

Additionally, optionally or alternatively, two or more distinct content viewer groups may be detected in a user population based at least in part on the information derived from the spatial audio or the audio metadata accompanying the spatial audio. In the present example, one group of content viewers may have specific eye movements correlated with or following the police car, whereas another group of content viewers may have second specific eye movements correlated with or following a chased car in the same video clip. The spatial locations of the sound sources such as police sirens can be used to correlate with an image portion depicting an object or a person at spatial locations not necessarily coinciding with the spatial locations of the sound sources. Rather, the spatial locations of the sound sources such as police sirens may be used to correlate with eye movements of a sizable percentage or group of content viewers based on the user viewing behavior data to determine the chased car as an ROI (in addition to or in place of the ROI depicting the police car), instead of or in addition to being correlated with the spatial locations of the image portions depicting the police car, which spatial location of the police car coincide with the spatial locations of the sound source (e.g., the police siren, etc.).

In these and other possible use cases, once an ROI is determined or predicted for a video image, coding techniques that better preserve video image quality may be applied to content (e.g., pixel values, etc.) in the ROI in the video image. These coding techniques produce low quantization errors (with a high number of quantization states), low coding errors, low distortions, high dynamic range, wide color gamut, high spatial resolution, less scaling down of PSNRs, etc., as compared with the rest of content of the video image. Accordingly, video images can be encoded under techniques as described herein with high efficiency and with reduced bandwidth usage. At the same time, the encoded video images under these techniques provide strong support for high quality viewing experience.

In some embodiments, determining and predicting ROIs in a video image as described herein is not static and uses a combination of artistic intent expressed by content creators, real-time user viewing behavior data, non-real-time user viewing behavior data, past histories of user viewing behavior data, etc., to determine or predict the ROIs in the video image at any given time point for content viewers in a user population. Additionally, optionally or alternatively, the content viewers' actual ROIs are monitored and used as feedbacks (e.g., ground truths, etc.) to refine and update further determining and predicting ROIs in the video image.

For example, initially, a video clip with the video image may be presented to content viewers without any ROI selection. As and when content viewers start viewing the video clip, actual ROI determinations made by the content viewers are collected/sampled. User viewing patterns and consensus may be determined and used to predict optimal a single ROI or multiple ROIs within the video image, a group of picture (GOP), video images between two adjacent scene cuts, a media program, etc. Over time, enough user viewing behavior data, user viewing patterns, user viewing consensus, unique path ROIs, spatial audio correlations, etc., are generated on a particular video clip that ROI(s) in the video clip or each video image therein can be determined with high probability before such video image is compressed and/or rendered with high efficiency and strong support for high quality viewing experience.

In some embodiments, visual, audio, and other user perceptible characteristics may be determined and extracted from a video clip that lacks user viewing behavior data, and correlated with corresponding visual, audio, and other user perceptible characteristics extracted from the other video clips that have user viewing behavior data, user viewing patterns, user viewing consensus, unique path ROIs, spatial audio correlations, etc. In some embodiments, instead of making no ROI selection for the video clip, which may be about to be newly released to content viewers, ROI(s) may still be determined or predicted directly or indirectly based on user viewing behavior data of other video clips that have user viewing behavior data, user viewing patterns, user viewing consensus, unique path ROIs, spatial audio correlations, etc.

6. IMPORTING USER VIEWING BEHAVIOR DATA

Under techniques as described herein, ROIs selections subjectively made by content viewers may be determined based on user viewing behavior data of first video clips such as previously released video clips, etc. The user viewing behavior data of the first video clips may be collected based on actions actually performed by or observed with content viewers of the first video clips.

In some embodiments, a (e.g., newly released, still being produced, to be released, etc.) second video clip may have no, little, inconclusive, or relatively low confidence user viewing behavior data, user viewing patterns, user viewing consensus, unique path ROIs, spatial audio correlations, etc. In some embodiments, in addition to or in place of using objective metrics to determine ROIs in video images of the second video clip, some or all of the first video clips may be (e.g., subjectively, based on subjective selections/determinations of ROIs by content viewers, etc.) correlated with the second video clip, for example, through ML-based ROI prediction techniques. In response to determining that some or all of the first video clips are correlated with the second video clip, some or all of the user viewing behavior data, user viewing patterns, user viewing consensus, unique path ROIs, spatial audio correlations, etc., as collected, determined or predicted for the first video clips may be used to determine or predict ROIs in (e.g., each video image of, etc.) the second video clip, for example, even before any content viewer sees the second video clip.

Figure 6A:
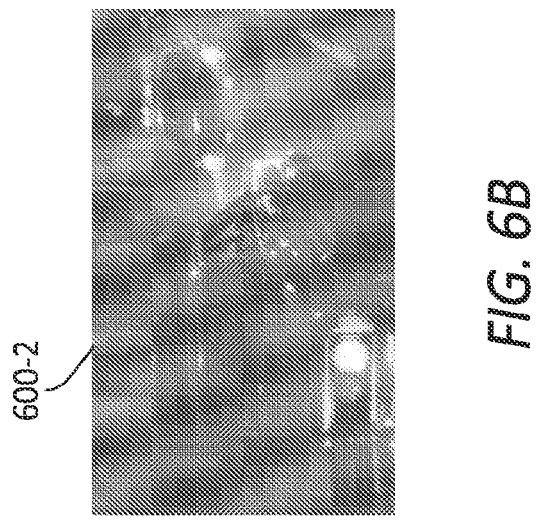
FIG. 6A and FIG. 6B illustrate example video images that are respectively in different video clips similar from a subjective perspective of content viewers.
Figure 6B:
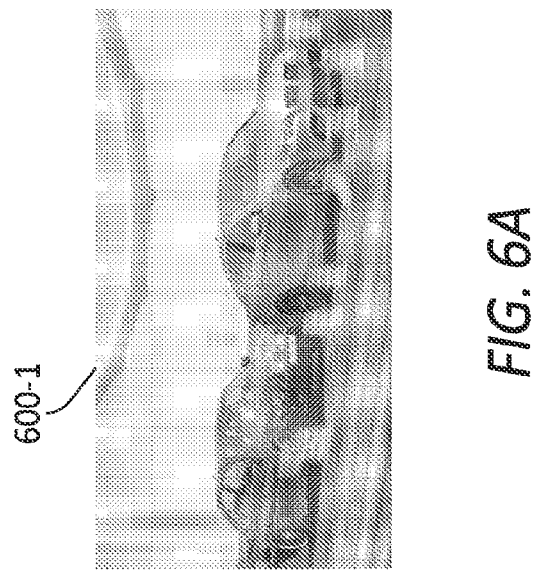

FIG. 6A and FIG. 6B illustrate two example video images that are respectively in two different video clips. More specifically, a first example video image 600-1 of FIG. 6A is in a previously released video clip for which user viewing behavior data has been collected, whereas a second example video image 600-2 of FIG. 6B is in a to-be-released video clip for which user viewing behavior data has not yet been collected.

The first video image (600-1) and the second video image (600-2) may have different audio and/or visual characteristics in terms of image properties (e.g., luminance histogram, chrominance histogram, average luminance, color ranges, etc.), in terms of video scene setup such as objects presented, background, car models, persons, times of day, etc.), etc. Thus, from a computer vision point of view, the video clips are two distinct video scenes. However, from content viewers' subjective point of view, both of the previous video clip and the to-be-released video clip belong to a class of video scenes depicting car chases.

In some embodiments, ML-based ROI prediction techniques may be applied to (e.g., image content of, audio content of, etc.) the previous video clip and the to-be-released video clip. These ML-based ROI prediction techniques can be used to find correlations between (e.g., visual and/or audio characteristics of, etc.) the two video clips, and to determine that the video scenes depicted by the video clips are the same subjective video scene class (e.g., "car chase," "dialog", etc.) from content viewers' subjective point of view.

In response to determining that the two video clips are correlated and/or that the two video clips depict the same video scene class (e.g., "car chase," "dialog", etc.), an ROI prediction system implementing techniques as described herein can transfer some or all of ROI-related information from the previous video clip to be used in the to-be-released video clip, thereby providing an early estimate (e.g., prediction, guidance, etc.) on which spatial regions of video images in the to-be-released video clip should be ROIs and how different portions of the video images should be differentially compressed and/or rendered without having received inputs or user viewing behavior data from content viewers of the to-be-released video clip.

For example, once these video images are determined to be from the same video scene class, ROI selections (e.g., police car, chased vehicle, etc.) made in connection with the first image (600-1) by content viewers of the first image (600-1) in the previous video clip can be correlated with ROI predictions (e.g., police car, chased vehicle, etc.) made in connection with the second image (600-2), even if no or few content viewers have seen the second image (600-2) in the to-be-released video clip.

In some embodiments, spatial audio information from (or for) the video scenes may be used to generate, confirm, verify, or modify a ROI selection/prediction. For example, locations of sound sources in both video scenes may be determined. Relationships (e.g., spatial relationships, temporal relationships, etc.) between locations of sound sources and ROIs determined in one video scene may be used together with locations of sound sources in another video scene to identify ROI selections/predictions in the other video scene.

In some embodiments, ROI information thus imported from previous video clips/scenes will be continuously monitored with feedbacks from content viewers and modified to rectify for errors. For example, if the imported ROI information leads to a prediction for a specific ROI that matches with ROI selections (e.g., consensus, patterns, one of multiple ROIs determined using a k-NN algorithm, etc.) actually made by content viewers of the to-be-released video clip, then the specific ROI is confirmed/verified and will be continually used to ensure image and audio qualities of the specific ROI. On the other hand, if the imported ROI information leads to a prediction for a specific ROI that does not match with ROI selections actually made by content viewers of the to-be-released video clip, then the specific ROI determined based on the imported ROI information from other video clips may be subjected to removal and may be discontinued to be used for ensuring image and audio qualities of the specific ROI.

Past histories of ROI information, predictions, confirmations, verifications, etc., of video clips can be stored in tangible storage media. These histories can be analyzed by an ROI prediction system as described herein in real time or in non-real time to determine whether ROI selection/prediction is successful or effective (e.g., based on ground truths, etc.). The ROI prediction system can be implemented with any in a variety of time resolutions to make ROI selections or predictions. For example, ROI selections, predictions, confirmations, verifications, etc., can be performed as needed every few seconds, every few video scenes, every few video clips, every few media programs, etc.

7. VERIFICATION AND FULFILLMENT OF ARTISTIC INTENT

User viewing behavior data and ROI selections/predictions made based on actual actions of content viewers in viewing a wide variety of video clips (or media programs) can be used to verify or confirm artistic intent that has been intended (e.g., by a director, by a color grader, by a video content creator, etc.) for specific media programs, specific video clips, specific video scenes, specific video images, etc.

When video content is (e.g., professionally, etc.) produced, it is important to have artistic intent conveyed properly to the audience; otherwise the artistic value of the video content may be lost or undercut. This is especially helpful in operational scenarios in which video content is produced for live re-enactments (e.g., stage shows, etc.) or video content for (e.g., mass, targeted, large scale, movie theater, home theater, DVD/BlueRay, cable, 360-degree video, non-360-degree video, VR, AR, remote presence, etc.) distribution. In some or all of these operational scenarios, it is important to know if the audience are acknowledging the artistic intent. This is especially important for making 360-degree videos, spherical videos, omnidirectional videos, large format rectangular videos, large format videos of other spatial shapes, etc., as artists, directors, video content creators, etc., may not be able to control where content viewers are to direct their individual fields of views or viewing angles.

Techniques as described herein can be used to analyze video content ahead of time to determine whether a specific artistic intent is likely to be acknowledged, for example, while the video content is being produced by content creators before release to content viewers. These techniques give artists, directors, color graders, video content creators, etc., a powerful tool for maximizing the impact of the artistic intent.

Using ROI information collected or imported from other video clips and other media programs, ROI selections and predictions can be made in video clips (or media programs) that are being produced. Compression and buffering of the video clips, especially in the case of 360-degree video content (or omnidirectional images), can be determined intelligently to preserve and/or enhance video and audio qualities of image portions in ROIs selected or predicted for the video clips. Additionally, optionally or alternatively, content creators can predictively analyze the ROI selections and predictions in the video clips to determine whether their artistic intent will be received in a way that the content creators have originally perceived for the video clips.

An ROI prediction system implementing techniques as described herein may extract audio and visual markers from video clips (or media programs); collect user viewing behavior data for the video clips based on eye gaze tracking, mouse cursor movement tracking, head motion tracking, etc.; correlate the audio and visual markers with the user viewing behavior data to figure out where content users (e.g., actually, predictively, etc.) direct their respective fields of views; etc.

In some embodiments, the ROI prediction system as described herein generates and saves marker-ROI correlation data based on the correlation of the audio and visual markers with the user viewing behavior data. The marker-ROI correlation data generated from a variety of media programs provides indications of where a content viewer is likely to focus or direct (e.g., visual, audio, non-visual non-audio, etc.) sensory cues relative to audio and visual content for a given (e.g., to-be-released, newly released, etc.) video clip or media program. For example, based on the marker-ROI correlation data, audio and visual features/characteristics of the given video clip can be extracted. These audio and visual features/characteristics can be used as search keys to locate audio and visual markers with similar audio and visual features. These audio and visual markers in turn can be used to locate marker-ROI correlation data specific to the audio and visual markers. The marker-ROI correlation data can then be used to predict or make ROI selections in the given video clip.

Thus, when a new video clip or a new media program is detected to be similar to existing video clips or existing media programs for which user viewing behavior data is available, the user viewing behavior data for the existing video clips or the existing media programs can be applied to the new video clip or the new media program to predict where a content viewer's sensory cues would likely focus on. This gives a content creator an insight of what the user would do with the new video clip or the new media program in the production stage before release.

Additionally, alternatively or optionally, as content viewers' behaviors in a given setting (e.g., 360-degree video viewing or omnidirectional video viewing, etc.) and in a given video clip or media program are predicted, a content creator can provide input to a content creation tool a particular type of artistic intent he is contemplating including but not limited to specific spatial regions of video images in the given video clip or media program where content viewers should direct their fields of views.

If it is determined that user viewing behavior data from similar video clips or similar media programs indicates a content viewer would direct sensory cues to the spatial regions (or intended ROIs) of the video images as contemplated by the content creator, then the video images may be so delivered to content viewers.

On the other hand, if it is determined that user viewing behavior data from similar video clips or similar media programs indicates a content viewer would not direct sensory cues to the spatial regions (or intended ROIs) of the video images as contemplated by the content creator, then the video images may be further modified before being delivered to content viewers. In some embodiments, the content creation tool implementing techniques as described herein can recommend additional inputs or changes to be added to the video images to make the content viewer more likely to comply to the artistic intent. For example, if the content creator intends to influence the content viewer or audience to look at the contemplated spatial location of the video images at given time points when these video images are rendered, the content creation tool can analyze available user viewing behavior data (e.g., from similar video content, from a preview audience, etc.) to identify where a majority of the content viewers or audience would be looking at. The content creation tool can recommend high frequency fluttering, dimming of other areas, audio cues, culture-based and non-culture-based vision cues (e.g., a video scene of raining in a flower garden to induce a sense of specific aromas, wood-burning to induce a sense of face heat, etc.), culture-based and non-culture-based vision cues (e.g., baby crying, police siren, etc.), etc., in order to move the content viewers' attentions to the contemplated spatial location of the video images in compliance with the artistic intent.

It should be noted that techniques as described herein can be used to determine or predict ROI(s) in video images for a user population that may or may not share the same content viewer characteristics. In some embodiments, a user population, or a portion therein, may be partitioned or created based on specific content viewer characteristics (e.g., any combination of one or more of: locale, race, sex, age, interest, education, culture, etc.). An ROI prediction system as described herein may be configured to determine ROI(s) in video images in a manner that compensates for the content viewer characteristics. For example, an image portion of raining in a lush garden may be identified as an ROI in a video image for a user population or a portion therein who share specific content viewer characteristics that are visually perceptive to such image content, while the same image portion may not be identified as an ROI in the same video image for another portion of the user population or another user population, who are not of specific content viewer characteristics that are visually perceptive to such image content. Similarly, an image portion may be identified as an ROI in a video image for a user population or a portion therein who falls in an age group (e.g., 25-35, etc.) that is visually perceptive or cued to such image content, while the same image portion may not be identified as an ROI in the same video image for another portion of the user population or another user population, who fall in a different group (e.g., 13-16, etc.) that is not visually perceptive or cued to such image content.

8. EXAMPLE MEDIA STREAMING SERVERS AND CLIENTS

FIG. 3A illustrates an example media streaming server 300 that comprises an image processor 302, a differential image encoder 312, etc. In some embodiments, the image processor (302) comprises an image receiver 306, a view behavior data collector 328, a ROI predictor 308, a data repository 310, etc. Some or all of the components of the media streaming server (300) may be implemented by one or more devices, modules, units, etc., in software, hardware, a combination of software and hardware, etc.

In some embodiments, the image receiver (306) comprises software, hardware, a combination of software and hardware, etc., configured to receive an input image stream 304 from an image source such as a cloud-based image source, a camera system that generates source images to be processed for an omnidirectional video application, a 360-degree video application, a non-360-degree video application, a VR application, an AR application, a remote presence application, a display application, etc.; decode the input image stream (304) into one or more input video images (e.g., a sequence of input video images, etc.); etc.

In some embodiments, input video images as described herein can be captured with one or more camera systems deployed in one or more spatial environments. Example spatial environments may include, but are not limited to only, any of: physical spatial environment, simulated spatial environment, movie studios, outdoor scenes, indoor scenes, tunnels, streets, vehicles, ships, aircrafts, outer space, etc. Example camera systems may include, but are not limited to only, any of: light field cameras, multiple cameras with overlapping and/or non-overlapping fields of vision, digital cameras, analog cameras, webcams, etc.

A video image (e.g., an input image, an encoded image, an output image, etc.) as described herein may be recorded or assembled as pixel values (e.g., similar to a painting made with pointillism techniques, etc.) distributed in an image (e.g., rectangular image, spherical image, etc.) of various spatial shapes. Example spatial shapes may include, but are not necessarily limited to only, any of: rectangular shapes, spherical shapes, panoramic shapes, regular shapes, irregular shapes, planar shapes, curved surface shapes, etc.

The media streaming server (300), or the image receiver (306) therein, may be configured to use the received sequence of video images as input to prepare video content for streaming to (downstream) media streaming clients in support of one or more of: 360-degree video applications, non-360-degree video applications, VR applications, AR applications, remote presence applications, display applications, etc. The streamed video content may comprise encoded video images generated by the differential image encoder (312).

In some embodiments, the viewer behavior data collector (328) comprises software, hardware, a combination of software and hardware, etc., configured to receive user viewing behavior data 326 from a plurality of downstream client devices of a plurality of content viewers in a user population of the encoded video images generated by the differential image encoder (312) and other video images (e.g., video images similar to the encoded video images, video images in different video clips or media programs, etc.) that may or may not be generated by the differential image encoder (312).

The user viewing behavior data (326) may be generated in a variety of ways such as eye gaze tracking, mouse cursor tracking, head movements, tracking of various other inputs, etc., that track actual actions performed by content viewers in viewing any in a wide variety of video clips (or media programs), in viewing specific video clips (or media programs), in viewing related video clips (or related media programs), in viewing the streamed video content while it is being streamed by the media streaming server (300), etc.

In some embodiments, the ROI predictor (308) comprises software, hardware, a combination of software and hardware, etc., configured to determine or predict ROIs in the input video images. The determination or prediction of the ROIs may be, but are not limited to only, image-based, Group-of-Picture (GOP)-based, scene-based, multiple-scene-based, etc.

In some embodiments, the ROIs may be predicted based on video metadata in image metadata received with and decoded from the input image stream (304). In some embodiments, an upstream media streaming server generates the input image stream (304) with a (e.g., uniform) high spatial resolution and/or delivers the input image stream (304) to the media streaming server (300) through one or more high bandwidth network connections. Additionally, optionally or alternatively, the upstream media streaming server and/or the media streaming server (300) can send image portions within ROIs as described herein in advance or in real time at content caching nodes (including possibly one or both of the upstream media streaming server and the media streaming server (300)), whereas other image portions outside the ROIs may or may not be cached or prebuffered in advance or in real time at content caching nodes. The image portions within the ROIs can be served from a local cache at the content caching nodes in a network (e.g., content delivery network, access network, core network, content distribution network, etc.) for low latency and/or at a relatively high bit rate than the other image portions, which may or may not be served out from the local cache and which may or may not be served for low latency and/or at a relatively high bit rate. As a result of prebuffering/caching, the image portions within the ROIs can be sent to requesting content clients (e.g., a media streaming client as described herein, etc.) relatively expeditiously as compared with the other image portions outside the ROIs.

In some embodiments, the ROIs may be predicted based on user viewing behavior data (e.g., 326, retrieved from the data repository (310), etc.) accessible to the ROI predictor (308).

In some embodiments, the media streaming server (300) may be configured to determine the ROIs (or intended ROIs) based at least in part on user input from a video content creator such as a director, a colorist, a video engineer, etc.

As used herein, an ROI (e.g., 104 of FIG. 1F, 104-1 and 104-2 of FIG. 2H, etc.) in the video image (e.g., 100 of FIG. 1A, 200 of FIG. 2A, 600-1 of FIG. 6A, 600-2 of FIG. 6B, etc.) may refer to a portion (e.g., spatial area portion, spatial volume portion, etc.) of the video image, and may be formed by a collection of (e.g., contiguous, disjoint, etc.) spatial positions in the video image.

Video image(s) may contain a single ROI or multiple ROIs that occupy different portions of the entire area of the video image(s). Image portions in different spatial locations of the video image (100) may be encoded in multiple video sub-streams and/or at different spatiotemporal resolutions. For example, images portions of spatial locations in a content viewer's viewport, in the content viewer's foveal vision, in the ROI(s), etc., may be encoded with relatively high spatiotemporal resolutions. Images portions of spatial locations not in any, some, or all of: a content viewer's viewport, in the content viewer's foveal vision, in the ROI(s), etc., may be encoded with relatively low spatiotemporal resolutions.

The content viewer's viewport may refer to the content viewer's field of view as provided on a display through which the content viewer views an image portion of a video image as described herein. The content viewer's viewport at runtime may be tracked by a face tracking device, an eye tracking device, a head motion tracker, etc. These tracking device(s) may operate in real time with the display on which the image portion of the video image (100) is rendered. As the user changes viewing angles and/or viewing distances from time to time, the tracking device(s) track and compute the viewing angles and/or viewing distances in a coordinate system in which the sequence of video images is represented, generates a time sequence of viewports (or a time sequence of fields of view), and signals each viewport in the time sequence of viewports to a local, remote or cloud-based media streaming server (e.g., 300, etc.) as described herein. Each such signaled viewport of the content viewer as received by the media streaming server may be indexed by a time point value or a viewport index value that corresponds to a time point value. The time point value may be associated or correlated by a media streaming server as described herein with a specific video image in the sequence of video images.

In some embodiments, shapes, sizes, aspect ratios, spatial locations, etc., of ROIs in video image(s) are not statically fixed a priori, but rather are determined, computed or predicted based on user viewing behavior data of the video image(s), user viewing behavior data of video images in the same subjective video scene class as the video image(s), etc. Additionally, optionally or alternatively, the content viewer's viewport, the content viewer's foveal vision, etc., may be used as a part of input to determine some or all of: the shapes, the sizes, the aspect ratios, the spatial locations, etc., of the ROIs in the video image(s). The shapes, sizes, aspect ratios, spatial locations, etc., of the ROIs need not to be identical to, or in exact delineation with, shapes, sizes, aspect ratios, spatial locations, etc., of the content viewer's viewport (e.g., 108-1, etc.), the content viewer's foveal vision, etc.

In some embodiments, ROIs in video image(s) may be generated or identified based at least in part on user viewing behavior data collected while content viewers of a user population are viewing the one or more video images, and/or while the content viewers of a user population are viewing video images similar to the one or more video images. The user viewing behavior data can be used or analyzed to indicate which specific viewing angles, area portions, etc., of the video images are being focused on by the content viewers, and to identify/determine ROIs in the video image(s).

In some embodiments, the user viewing behavior data may be (e.g., dynamically, up to a certain time point, etc.) updated based on a user feedback loop. Initially, no ROIs may be determined based on the user viewing behavior data. Additionally, alternatively or optionally, ROIs may be determined based on user viewing behavior data imported from video images similar to the video image(s). The user viewing behavior data of the video image(s) may be collected with the content viewers' devices while the content viewers are viewing the video image(s). Additionally, optionally, alternatively, machine learning may be implemented to analyze the collected user viewing behavior data. The user viewing behavior data may provide a spatial distribution (or a statistical distribution) of the users' viewing angles, the users' viewing time durations at any given viewing angles, etc., in relation to different area portions of the video image(s). The spatial distribution of the users' viewing angles, the users' viewing time durations at any given viewing angles, etc., may be used to identify ROIs in the video image(s). As more and more user viewing behavior data are collected and incorporated into predicting the ROIs, the ROIs can be detected relatively accurately.

In some embodiments, video metadata specifying (e.g., in terms of coordinates, locations, boundaries, etc.) some or all of: ROIs, geometric information related to the ROIs, etc., in the video image(s) may be provided with the video image(s) to a downstream module/device, such as a media streaming server or a module therein, etc., for further processing. In some embodiments, the video metadata can be updated from time to time, continuously, periodically, programmatically, without manual input, etc., with new user viewing behavior data, new iterations of ROI predictions, etc.

In some embodiments, video metadata as described herein may be generated by the media streaming server (300) and/or the upstream system based on user viewing behavior data collected in a user feedback loop while users of a user population are viewing the one or more video images. Machine learning may be applied to analyzing the user viewing behavior data collected in the user feedback loop. For example, a heat map may be generated based on the user viewing behavior data indicating which specific viewing angles, regional cross sections, etc., of the input video images are respectively extremely high user interest levels, moderately high user interest levels, low user interest levels, extremely low user interest levels, etc. The heat map may be included in, or may be used to generate, the video metadata. Additionally, optionally, or alternatively, in some embodiments, information such as heat maps, etc., obtained from any combination of user input, image content analyses, user feedback loops, machine learning, etc., performed on some video programs may be applied prospectively to other video programs.

In some embodiments, the data repository (310) represents one or more databases, one or more data storage units/modules/devices, etc., configured to support operations such as storing, updating, retrieving, deleting, etc., with respect to some or all of the input video images, image metadata such as video metadata, user viewing behavior data, etc.

In some embodiments, the differential image encoder (308) comprises software, hardware, a combination of software and hardware, etc., configured to receive, via a bidirectional data flow 314, viewing angles, sizes, aspect ratios, etc., of a user's fields of view over time in relation to a spatial coordinate system in which video content is to be rendered in the user's fields of view input video images; generate an overall video stream comprising different video sub-streams for the regional cross sections of different types encoded with different spatial resolutions and/or different frame rates; provide/transmit the overall video stream via the bidirectional data flow 314 directly or indirectly through intermediate devices, etc. to a media streaming client, a display device, a storage device, etc.

Additionally, optionally, or alternatively, some or all of image processing operations such as image rotation determination, image alignment analysis, scene cut detections, transformation between coordinate systems, temporal dampening, display management, content mapping, color mapping, field-of-view management, etc., may be performed by the media streaming server (300).

The media streaming server (300) may be used to support real time vision applications, near-real-time vision applications, non-real-time vision applications, virtual reality, augmented reality, helmet mounted display applications, heads up display applications, games, 2D display applications, 3D display applications, multi-view display applications, omnidirectional display applications, etc. For example, some or all of video images, image metadata, viewport parameters (e.g., viewport center coordinates, aspect ratios, etc.), per-viewport image metadata, viewport image data, etc., are generated or accessed by the media streaming server (300) in real time, in near real time, etc.

FIG. 3B illustrates an example image rendering system 324-1 that comprises a differential image decoder 316, a display manager 318, an image display 320, etc. Some or all of the components of the image rendering system (324-1) may be implemented by one or more devices, modules, units, etc., in software, hardware, a combination of software and hardware, etc.

In some embodiments, the differential image decoder (316) comprises software, hardware, a combination of software and hardware, etc., configured to send, via a bidirectional data flow 314, viewing angles, sizes, aspect ratios, etc., of a user's fields of view over time in relation to a spatial coordinate system in which video content is to be rendered in the user's fields of view input video images; receive an overall video stream comprising different video sub-streams for regional cross sections of different types encoded with different spatial resolutions and/or different frame rates; etc.

The user may move the user's viewport to different fields of view at runtime. The image rendering system (324-1) is configured to generate video content to be rendered on the user's display. In some embodiments, video content from one or more video sub-streams in the received video stream may be stitched or composited together to form a unified imagery. De-blocking operations, de-contouring operations, blurring operations, etc., may be performed as a part of compositing the video content to be rendered on the user's display.

In some embodiments, the display manager (318) comprises software, hardware, a combination of software and hardware, etc., configured to perform display management operations on the video content to be rendered on the image display (320), where the video content is decoded and composited from the video sub-streams in the overall video stream received by the image rendering system (324-1); output display managed video content to the image display (320) for rendering; etc.

Additionally, optionally, or alternatively, some or all of image rendering operations such as face detection, head tracking, motion detection, position detection, rotation determination, transformation between coordinate systems, temporal dampening of time-varying image parameters, any other temporal manipulation of image parameters, display management, content mapping, tone mapping, color mapping, field-of-view management, prediction, navigations through mouse, trackball, keyboard, foot tracker, actual body motion, etc., may be performed by the image rendering system (324-1).

The image rendering system (324-1) may be used to support real time vision applications, near-real-time vision applications, non-real-time vision applications, virtual reality, augmented reality, helmet mounted display applications, heads up display applications, games, 2D display applications, 3D display applications, multi-view display applications, omnidirectional display applications, etc. For example, some or all of video images, image metadata, viewport parameters (e.g., viewport center coordinates, aspect ratios, etc.), per-viewport image metadata, viewport image data, etc., are generated or accessed by the image rendering system (324-1) in real time, in near real time, etc.

Techniques as described herein can be implemented in a variety of system architectures. Some or all image processing operations as described herein can be implemented by one or more of cloud-based media streaming servers, media streaming servers collocated with or incorporated into media streaming clients, image rendering systems, image rendering systems, display devices, etc. Based on one or more factors such as types of vision applications, bandwidth/bitrate budgets, computing capabilities, resources, loads, etc., of recipient devices, computing capabilities, resources, loads, etc., of media streaming servers and/or computer networks, etc., some image processing operations can be performed by a media streaming server, while some other image processing operations can be performed by a media streaming client, an image rendering system, a display device, etc.

FIG. 3C illustrates an example configuration in which a differential image encoder (e.g., 312, etc.) is incorporated into an edge media streaming server 324-2. In some embodiments, an image processor 302 of FIG. 3C may be cloud-based. In some embodiments, the image processor (302) may be located in a core network separate from edge devices such as the edge media streaming server (324-2). As in FIG. 3A, the image processor (302) may comprise an image receiver 306, a ROI predictor 308, a data repository 310, etc. The image processor (302) may represent an upstream media streaming server that communicates with the edge media streaming server (324-2) over relatively high bitrates. Some or all of the components of the image processor (302) and/or the edge media streaming server (324-2) may be implemented by one or more devices, modules, units, etc., in software, hardware, a combination of software and hardware, etc.

In some embodiments, the image processor (302) is configured to output video images and video metadata in a data flow 322 to downstream devices one of which may be the edge media streaming server (324-2).

In some embodiments, the edge media streaming server (324-2), or the differential image encoder (312) therein, comprises software, hardware, a combination of software and hardware, etc., configured to determine viewing angles, sizes, aspect ratios, etc., of a user's fields of view over time in relation to a spatial coordinate system in which video content is to be rendered in the user's fields of view input video images; generate an overall video stream comprising different video sub-streams for the regional cross sections of different types encoded with different spatial resolutions and/or different frame rates; provide/transmit the overall video stream via the bidirectional data flow 314 directly or indirectly through intermediate devices, etc.) to a media streaming client, a display device, a storage device, etc.

In some embodiments, an image rendering device (e.g., 324-1), or a display manager (e.g., 318 of FIG. 3B) therein, comprises software, hardware, a combination of software and hardware, etc., configured to perform display management operations on video content to be rendered on the image display (320), where the video content is decoded and composited from the video sub-streams in the overall video stream received by the image rendering system (324-1); output display managed video content to the image display (320) for rendering; etc.

The user may move the user's viewport to different fields of view at runtime. The image rendering system (324-2) is configured to generate video content to be rendered on the user's display. In some embodiments, video content from one or more video sub-streams in the received video stream may be stitched or composited together to form a unified imagery. De-blocking operations, de-contouring operations, blurring operations, etc., may be performed as a part of compositing the video content to be rendered on the user's display.

9. EXAMPLE PROCESS FLOWS

FIG. 4B illustrates an example process flow according to an example embodiment of the present invention. In some example embodiments, one or more computing devices or components may perform this process flow. In block 422, an image processor (e.g., a media streaming server or a media streaming client of FIG. 3A through FIG. 3C, etc.) renders one or more video images in a plurality of viewports of a plurality of content viewers. A content viewer in the plurality of content viewers views the one or more video images through a respective viewport in the plurality of viewports.

In block 424, the image processor determines a plurality of spatial locations, in the one or more video images, to which a plurality of foveal visions of the plurality of content viewers is directed.

In block 426, the image processor identifies, based on the plurality of spatial locations in the one or more video images, one or more ROIs in the one or more video images.

In an embodiment, the image processor is further configured to perform: compressing pixel values, of the one or more video images, in the one or more ROIs with first peak-signal-noise-ratios (PSNRs); compressing pixel values, of the one or more video images, not in the one or more ROIs with second PSNRs lower than the first PSNRs; etc.

In an embodiment, the image processor is further configured to perform: classifying the plurality of foveal visions of the plurality of viewers into two or more foveal vision clusters; identifying two or more ROIs from the two or more foveal vision clusters; etc.

In an embodiment, the plurality of foveal visions of the plurality of viewers is classified into the two or more foveal vision clusters based on one or more of: k-NN classification algorithms, k-means clustering algorithms, linear discriminant analyses (LDAs), nearest centroid classifiers, nearest prototype classifiers, Rochhio classifiers, etc.

In an embodiment, the image processor is further configured to perform: determining a plurality of unique path ROIs, in the one or more video images, for the plurality of viewers in a video clip that includes the one or more video images; determining at least one of the one or more ROIs based in part on one or more unique ROIs in the plurality of unique path ROIs; etc.

In an embodiment, the image processor is further configured to perform: determining one or more spatial locations, represented in the one or more video images, of sound sources, in spatial audio to be concurrently rendered with the one or more video images; determining at least one of the one or more ROIs based in part on the one or more spatial locations of the sound sources in the spatial audio; etc.

In an embodiment, the plurality of image locations is identified based on first viewing behavior data that comprise the plurality of foveal visions of the plurality of viewers; the first viewing behavior data are collected from the plurality of viewers up to a first time point; the image processor is further configured to perform: collecting second viewing behavior data that comprise a second plurality of foveal visions of a second plurality of viewers, the second viewing behavior data being at least partly collected from the plurality of viewers after the first time point; determining a second plurality of spatial locations, in the one or more video images, to which the second plurality of foveal visions of the plurality of viewers is directed; identifying, based on the second plurality of spatial locations in the one or more video images, one or more second regions of interest (ROIs) in the one or more video images; etc.

In an embodiment, the image processor is further configured to perform: determining a set of user perceivable characteristics in connection with the one or more video images; determining a set of second user perceivable characteristics in connection with one or more second video images; based on the set of user perceivable characteristics and the second set of user perceivable characteristics, predicting a second ROI, in the one or more second video images, that have one or more second perceivable characteristics correlating with one or more user perceivable characteristics of an ROI in the one or more video images; etc.

In an embodiment, the second ROI in the one or more second video images is identified from the one or more user perceivable characteristics before user viewing behavior data have been collected from the one or more second video images.

In an embodiment, the second ROI in the one or more second video images is identified from the one or more user perceivable characteristics after at least a part of user viewing behavior data has been collected from the one or more second video images.

In an embodiment, the one or more user perceivable characteristics comprise at least one of: one or more visual characteristics, one or more audio characteristics, one or more non-visual non-audio user perceptible characteristics, etc.

In an embodiment, the one or more video images are in a first video clip, whereas the one or more second video images are in a second different video clip.

In an embodiment, the image processor is further configured to perform: classifying the one or more video images into a specific video scene class; classifying the one or more second video images into a second specific video scene class; based on the specific video scene class of the one or more video images and the second specific video scene class of the one or more second video images, predicting a second ROI, in the one or more second video images, that correlates with an ROI in the one or more video images; etc.

In an embodiment, video content of the ROI in the one or more video images is used to determine the specific video scene class for the one or more video images; second video content of the second ROI in the one or more second video images is used to determine the second specific video scene class for the one or more second video images.

In an embodiment, the specific video scene class is same as the second specific video scene class.

In an embodiment, objective metrics of computer vision for the one or more video images are different from those for the one or more second video images.

In an embodiment, the objective metrics of computer vision comprise one or more of: luminance characteristics, luminance distributions, chrominance characteristics, chrominance distributions, spatial resolutions, etc.

In an embodiment, the image processor is further configured to perform: correlating one or more sound sources, in spatial audio for the one or more video images, to the ROI in the one or more video images; determining one or more second sound sources in second spatial audio for the one or more second video images; predicting the second ROI based at least in part on one or more spatial locations, in the one or more second video images, of the one or more second sound sources; etc.

In an embodiment, the image processor is further configured to perform: collecting user viewing behavior data of the one or more second video images; verifying, based on the user viewing behavior data of the one or more second video images, whether the second ROI in the second image is a correctly ROI as predicted based on the specific video scene class of the one or more video images and the second specific video scene class of the one or more second video images; etc.

In an embodiment, the image processor is further configured to perform: encoding one or more image portions in the one or more ROI of the one or more video images and one or more image portions outside the one or more ROI of the one or more video images into two or more video sub-streams at two or more different spatiotemporal resolutions; transmitting, to a streaming client device, an overall video stream that includes the two or more video sub-streams; etc.

FIG. 4C illustrates an example process flow according to an example embodiment of the present invention. In some example embodiments, one or more computing devices or components may perform this process flow. In block 442, an image processor (e.g., a media streaming server or a media streaming client of FIG. 3A through FIG. 3C, etc.) receives user input specifying one or more pre-designated ROIs in one or more video images.

In block 444, the image processor identifies one or more second video images that are similar to the one or more video images.

In block 446, the image processor, based at least in part on available user viewing behavior data collected for the one or more second video images, determines whether the pre-designated ROIs are to be perceived by prospective content viewers as ROIs.

In an embodiment, the image processor is further configured to perform: in response to determining that the pre-designated ROIs are not to be perceived by prospective content viewers as ROIs, adding one or more user perceptible cues to cause the prospective content viewers to perceive the pre-designated ROIs.

In an embodiment, the image processor is further configured to perform: extracting one or more first user perceptible markers from the one or more video images; extracting one or more second user perceptible markers from the one or more second video images; identifying the one or more second video images based on similarity between the one or more first user perceptible markers and the one or more second user perceptible markers; etc.

In an embodiment, the one or more user perceptible cues comprises one or more of: visual cues, audio cues, or motion-related cues.

In various example embodiments, an apparatus, a system, an apparatus, or one or more other computing devices performs any or a part of the foregoing methods as described. In an embodiment, a non-transitory computer readable storage medium stores software instructions, which when executed by one or more processors causes performance of a method as described herein.

Note that, although separate embodiments are discussed herein, any combination of embodiments and/or partial embodiments discussed herein may be combined to form further embodiments.

10. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
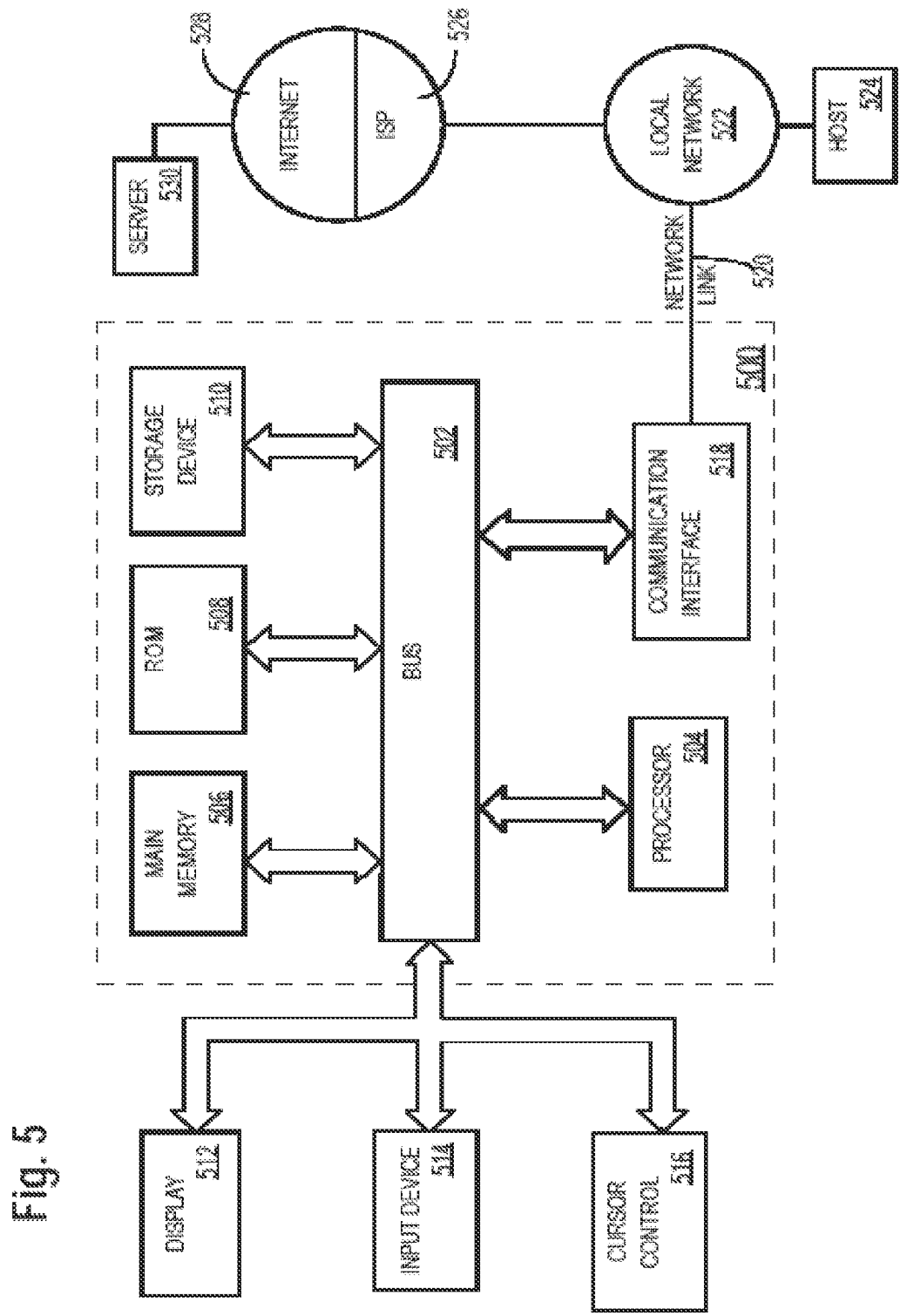
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

11. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for determining regions of interest (ROIs) in video images, comprising:
    generating user viewing behavior data while rendering a video clip including a video image in a plurality of viewports of a plurality of content viewers, wherein each content viewer in the plurality of content viewers views the video clip including the video image through a respective viewport in the plurality of viewports;
    determining, from the user viewing behavior data, a plurality of spatial locations as candidate ROIs, in the video image and other video images of the video clip, to which a plurality of foveal visions of the plurality of content viewers is directed;
    identifying, based on the plurality of spatial locations in the video image and the other images of the video clip, one or more unique spatial paths represented in the video clip, wherein the one or more unique spatial paths are identified by applying one or more computing techniques to the plurality of spatial locations in the video image and the other images of the video clip;
    using the one or more unique spatial paths represented in the video clip to identify at least one of two or more ROIs in the video image;

encoding two or more image portions in the two or more ROIs of the video image and one or more other image portions outside the two or more ROIs of the video image into a video stream;

wherein the two or more image portions are non-overlapping with the one or more other image portions;

wherein the two or more image portions in the two or more ROIs of the video image are encoded in the video stream at spatiotemporal resolutions higher than other spatiotemporal resolutions at which the one or more other image portions outside the two or more ROIs of the video image are encoded in the video stream;

transmitting, to a streaming client device, the video stream.

2. The method of claim 1, further comprising:
compressing pixel values, of the video image, in the two or more image portions in the two or more ROIs with first peak-signal-noise-ratios (PSNRs);
compressing pixel values, of the video image, in the one or more other image portions outside the two or more ROIs with second PSNRs lower than the first PSNRs.

3. The method of claim 1, further comprising:
classifying the plurality of foveal visions of the plurality of content viewers into two or more foveal vision clusters;
identifying the two or more ROIs from the two or more foveal vision clusters.

4. The method of claim 3, wherein the two or more ROIs include at least one ROI predicted based on one or more of: artificial intelligence methods, machine learning methods, k-NN classification algorithms, k-means clustering algorithms, linear discriminant analyses (LDAs), nearest centroid classifiers, nearest prototype classifiers, or Rochhio classifiers.

5. The method of claim 1, further comprising:
determining one or more spatial locations, represented in the one or more first video images, of sound sources, in spatial audio to be concurrently rendered with the one or more first video images;
determining at least one of the one or more ROIs based in part on the one or more spatial locations of the sound sources in the spatial audio.

6. The method of claim 1, wherein the plurality of image locations is identified based on first viewing behavior data that comprise the plurality of foveal visions of the plurality of content viewers; wherein the first viewing behavior data are collected from the plurality of content viewers up to a first time point; further comprising:
collecting second viewing behavior data that comprise a second plurality of foveal visions of a second plurality of content viewers, wherein the second viewing behavior data are at least partly collected from the plurality of content viewers after the first time point;
determining a second plurality of spatial locations, in the video image, to which the second plurality of foveal visions of the plurality of content viewers is directed;
identifying, based on the second plurality of spatial locations in the video image, one or more second ROIs in the video image.

7. The method of claim 1, further comprising:
determining a set of user perceivable characteristics in connection with the video image;
determining a set of second user perceivable characteristics in connection with a second video image;
based on the set of user perceivable characteristics and the second set of user perceivable characteristics, predicting a second ROI, in the second video image, that have one or more second perceivable characteristics correlating with one or more user perceivable characteristics of an ROI in the video image.

8. The method of claim 7, wherein the second ROI in the second video image is identified from the one or more user perceivable characteristics before user viewing behavior data have been collected from the second video image.

9. The method of claim 7, wherein the second ROI in the second video image is identified from the one or more user perceivable characteristics after at least a part of user viewing behavior data has been collected from the second video image.

10. The method of claim 7, wherein the one or more user perceivable characteristics comprise at least one of: one or more visual characteristics, one or more audio characteristics, or one or more non-visual non-audio user perceptible characteristics.

11. The method of claim 7, wherein the video image is in a first video clip, and wherein the second video image is in a second different video clip.

12. The method of claim 7, wherein objective metrics of computer vision for the video image is different from those for the second video image.

13. The method of claim 12, wherein the objective metrics of computer vision comprise one or more of: luminance characteristics, luminance distributions, chrominance characteristics, chrominance distributions, or spatial resolutions.

14. The method of claim 7, further comprising:
correlating a sound source, in spatial audio for the video image, to a ROI in the two or more ROIs of the video image;
determining one or more second sound sources in second spatial audio for the second video image;
predicting at least one of the one or more ROIs in the second video image, based at least in part on one or more spatial locations of the one or more second sound sources in the second video image.

15. An apparatus performing the method as recited in claim 1.

16. A system performing the method as recited in claim 1.

17. A non-transitory computer readable storage medium, storing software instructions, which when executed by one or more processors causes performance of the method recited in claim 1.

18. A computing device comprising one or more processors and one or more non-transitory storage media, storing a set of instructions, which when executed by one or more processors cause performance of the method recited in claim 1.

* * * * *